United States Patent
Henderson et al.

(10) Patent No.: US 10,988,605 B2
(45) Date of Patent: Apr. 27, 2021

(54) PVC COMPOSITIONS, FILMS, LAMINATES AND RELATED METHODS

(71) Applicant: Avery Dennison Corporation, Glendale, CA (US)

(72) Inventors: Kevin O. Henderson, Willoughby Hills, OH (US); Mark Alessandro, Lakewood, OH (US); Michael E. Hannington, Madison, OH (US); Ying Hu, Mentor, OH (US); Paul R. Klich, Lyndhurst, OH (US); Emre Unsal, Painesville, OH (US)

(73) Assignee: Avery Dennison Corporation, Glendale, CA (US)

( * ) Notice: Subject to any disclaimer, the term of this patent is extended or adjusted under 35 U.S.C. 154(b) by 127 days.

(21) Appl. No.: 16/190,085

(22) Filed: Nov. 13, 2018

(65) Prior Publication Data

US 2019/0144657 A1 May 16, 2019

Related U.S. Application Data

(60) Provisional application No. 62/684,244, filed on Jun. 13, 2018, provisional application No. 62/585,973, filed on Nov. 14, 2017.

(51) Int. Cl.

| | |
|---|---|
| C08L 27/06 | (2006.01) |
| C08J 5/18 | (2006.01) |
| G02B 5/128 | (2006.01) |
| C08K 5/17 | (2006.01) |
| B32B 7/12 | (2006.01) |
| B32B 7/06 | (2019.01) |
| B32B 27/08 | (2006.01) |
| B32B 27/16 | (2006.01) |
| B32B 27/10 | (2006.01) |
| B32B 23/08 | (2006.01) |
| B32B 27/32 | (2006.01) |
| B32B 27/40 | (2006.01) |
| C09D 127/06 | (2006.01) |
| C08J 5/12 | (2006.01) |
| C08K 5/00 | (2006.01) |
| C08K 5/1515 | (2006.01) |

(52) U.S. Cl.
CPC ............... *C08L 27/06* (2013.01); *B32B 7/12* (2013.01); *C08J 5/121* (2013.01); *C08J 5/18* (2013.01); *C08K 5/005* (2013.01); *C08K 5/0016* (2013.01); *C08K 5/17* (2013.01); *C09D 127/06* (2013.01); *G02B 5/128* (2013.01); *C08J 2327/06* (2013.01); *C08J 2427/06* (2013.01); *C08J 2483/04* (2013.01); *C08K 5/1515* (2013.01); *C08L 2205/025* (2013.01); *C08L 2205/03* (2013.01); *C08L 2205/035* (2013.01)

(58) Field of Classification Search
None
See application file for complete search history.

(56) References Cited

U.S. PATENT DOCUMENTS

| | | | |
|---|---|---|---|
| 3,142,377 A | 7/1964 | Lulla et al. | |
| 4,767,808 A | 8/1988 | Kydonieus et al. | |
| 5,631,064 A | 5/1997 | Marecki | |
| 5,714,538 A | 2/1998 | Beach et al. | |
| 6,011,108 A | 1/2000 | Gurganus et al. | |
| 6,111,004 A | 8/2000 | Biesiada et al. | |
| 6,414,076 B1 * | 7/2002 | Moran | C08L 27/06 524/292 |
| 6,548,164 B1 | 4/2003 | Bacon, Jr. | |
| 6,706,806 B2 | 3/2004 | Lang et al. | |
| 6,770,360 B2 | 8/2004 | Mientus et al. | |
| 6,797,753 B2 | 9/2004 | Benecke et al. | |
| 7,348,380 B2 | 3/2008 | Koube et al. | |
| 7,741,403 B2 | 6/2010 | Geilen et al. | |
| 8,003,176 B2 | 8/2011 | Ylitalo et al. | |
| 8,507,596 B2 | 8/2013 | Frenkel | |
| 8,598,259 B2 | 12/2013 | Odagiri et al. | |
| 8,697,787 B2 | 4/2014 | Chaudhary | |
| 8,722,761 B2 | 5/2014 | Subramanian et al. | |
| 8,741,404 B2 | 6/2014 | Dante et al. | |
| 8,859,654 B2 | 10/2014 | Chaudhary et al. | |
| 9,056,965 B2 | 6/2015 | Mundra et al. | |
| 9,321,901 B2 | 4/2016 | Frenkel et al. | |
| 9,346,939 B2 | 5/2016 | Frenkel et al. | |

(Continued)

FOREIGN PATENT DOCUMENTS

| | | |
|---|---|---|
| EP | 2336237 | 6/2011 |
| EP | 2470597 | 9/2013 |
| WO | 2017/215747 | 12/2017 |

OTHER PUBLICATIONS

International Search Report and Written Opinion dated Mar. 4, 2019 issued in corresponding IA No. PCT/US2018/060861 filed Nov. 13, 2018.
International Preliminary Report on Patentability dated May 28, 2020 issued in corresponding IA No. PCT/US2018/060861 filed Nov. 13, 2018.
International Preliminary Report on Patentability dated May 28, 2020 issued in corresponding IA No. PCT/US2018/060846 filed Nov. 13, 2018.
VESTOLIT G 178 (170 Series) Polyvinyl Chloride Homopolymer, Mexichem Specialty Resins, http://www.mexichem.us/MSR/wp-content/uploads/2016/04/VESTOLIT-G-178-170-Series.pdf, Mar. 2016, 2 pages.

(Continued)

*Primary Examiner* — Sheeba Ahmed

(57) ABSTRACT

Polyvinyl chloride compositions and films formed therefrom are described which exhibit improved printability and resistance to weathering. The compositions generally comprise polyvinyl chloride, at least one plasticizer, at least one heat stabilizer, certain UV stabilizer(s), and print additives and/or other agents. In particular versions, the compositions utilize a combination of polyvinyl chloride resins. Also described are various vinyl-based laminates using the films which can be for example reflective products. Also described are methods of producing the noted laminates.

40 Claims, 15 Drawing Sheets

(56) References Cited

U.S. PATENT DOCUMENTS

| | | | |
|---|---|---|---|
| 9,464,187 | B2 | 10/2016 | Kann |
| 2002/0142121 | A1 | 10/2002 | Hingsen-Gehrmann et al. |
| 2003/0138635 | A1 | 7/2003 | Haruta et al. |
| 2005/0260414 | A1 | 11/2005 | MacQueen |
| 2009/0246465 | A1* | 10/2009 | Buoni .................. B41M 5/504 428/142 |
| 2009/0300953 | A1 | 12/2009 | Frisch et al. |
| 2013/0106091 | A1 | 5/2013 | Kirchmeyer et al. |
| 2014/0227463 | A1 | 8/2014 | Srivatsan et al. |
| 2014/0242316 | A1 | 8/2014 | Shih et al. |
| 2014/0287204 | A1 | 9/2014 | Rummens et al. |
| 2014/0343201 | A1 | 11/2014 | Laufer et al. |
| 2015/0059080 | A1 | 3/2015 | Mackinlay et al. |
| 2016/0009937 | A1 | 1/2016 | Dannewitz |
| 2016/0160020 | A1 | 6/2016 | Matsuoka |
| 2016/0326346 | A1 | 11/2016 | Gourdin et al. |
| 2017/0101524 | A1 | 4/2017 | Simonis et al. |
| 2018/0066120 | A1* | 3/2018 | Nishimura .............. B32B 27/30 |

OTHER PUBLICATIONS

VESTOLIT G 173 (170 Series) Polyvinyl Chloride Homopolymer, Mexichem Specialty Resins, http://www.mexichem.us/MSR/wp-content/uploads/2016/04/VESTOLIT-G-178-170-Series.pdf, Jul. 2016, 2 pages.

VESTOLIT G 171 (170 Series) Polyvinyl Chloride Homopolymer, Mexichem Specialty Resins, http://www.mexichem.us/MSR/wp-content/uploads/2016/04/VESTOLIT-G-171-170-Series.pdf, Mar. 2016, 2 pages.

MARK 4825 Liquid Ba-Zn PVC Heat Stabilizer Technical Information, Galata Chemicals, Feb. 1, 2014, 1 page.

Drapex Alpha 200 Series Primary Biobased Plasticizers, Galata Chemicals, http://www.galatachemicals.com/pdf/Galata_DrapexAlpha1.pdf, date unknown, 6 pages.

Drapex Alpha 200C Safety Data Sheet, Galata Chemicals, Mar. 21, 2012, 7 pages.

Altenhofen da Silva et al., "Polyvinylchloride (PVC) and natural rubber films plasticized with a naturel polymeric plasticizer obtained through polyesterification of rice fatty acid," Polymer Testing 30 (2011) 478-84.

Avery Dennison Corporation, "Overlaminate Films," https://graphics.averydennison.com/en/home/graphics-products/digitally-printable-films/overlaminate-films.html.

Xie et al., "Effects of Bio-Based Plasticizers on Mechanical and Thermal Properties of PVC/Wood Four Composites," BioResources 9(4) 7389-7402 (2014).

International Search Report and Written Opinion dated Feb. 1, 2019 issued in corresponding IA No. PCT/US2018/60846.

Baerlocher, "Metallic stearates" (Dec. 2005) [retrieved Jan. 9, 2019], https://www.baerlocher.com/fileadmin/media/0.5_service/0.5.1_brochures/0.5.1.3_produt_brochures/metallic_stearates.pdf, (24 pages).

* cited by examiner

PVC COMPOSITIONS, FILMS, LAMINATES AND RELATED METHODS

CROSS REFERENCES TO RELATED APPLICATIONS

This application claims priority upon U.S. Ser. No. 62/585,973 filed Nov. 14, 2017; and Ser. No. 62/684,244 filed Jun. 13, 2018, all of which are hereby incorporated by reference.

FIELD

The present subject matter relates to polyvinyl chloride (PVC) compositions and films formed from such compositions. The resulting films exhibit a variety of beneficial characteristics including improved printability and weather stability. The present subject matter also relates to laminates and related methods of producing and using such laminates.

BACKGROUND

Retro-reflective film products are known which include a multi-layered construction of a plasticized polymeric vinyl film, a urethane bonding layer, glass beads embedded in a low-refractive index layer, vacuum-metallized aluminum and a pressure sensitive adhesive. These products are intended for long term outdoor use and are typically in the form of adhesive-backed films having print and/or decorative outer faces that are applied to vehicles and signage.

In many applications, the vinyl can become unstable due to exposure to weather elements and UV radiation. Once the vinyl begins to degrade, the reflectivity of the product is compromised. In addition, weathering of the vinyl typically results in cracking, delamination, or other undesirable physical changes in the product. Accordingly, a need remains for flexible vinyl films with improved weather stability.

Many retro-reflective film products receive indicia, text, and/or graphic designs printed along an outer face of the product. Printing on the vinyl film is typically accompanied with inconsistent performance and/or appearance between printed areas or regions on the product. In addition, differences in print image quality, intensity, and/or resolution can also occur between printed regions on the product. Accordingly, a need exists for flexible vinyl films with improved printability characteristics.

SUMMARY

The difficulties and drawbacks associated with previous approaches are addressed in the present subject matter as follows.

In one aspect, the present subject matter provides a vinyl composition comprising polyvinyl chloride (PVC), at least one plasticizer, at least one UV stabilizer, at least one heat stabilizer, and at least one print additive.

In another aspect, the present subject matter provides a vinyl film comprising polyvinyl chloride (PVC), at least one plasticizer, at least one UV stabilizer, at least one heat stabilizer, and at least one print additive.

In another aspect, the present subject matter provides a laminate comprising a vinyl film, a first adhesive layer, optical components, a spacing layer, a metal layer, and a second adhesive layer. The vinyl film includes polyvinyl chloride (PVC), at least one plasticizer, at least one UV stabilizer, at least one heat stabilizer, and at least one print additive.

In another aspect, the present subject matter provides a method for producing a laminate. The method comprises providing a carrier assembly. The method also comprises forming a spacing layer on the carrier assembly. The spacing layer defines an outer face. The method additionally comprises incorporating a plurality of optical components along the outer face of the spacing layer. In some embodiments, a pigment may be dispersed in between the optical components. The method further comprises forming a first adhesive layer on the spacing layer. The method also comprises forming a vinyl layer on the first adhesive layer. The method additionally comprises removing the carrier assembly from the spacing layer, revealing a second surface of the spacing layer. The method also comprises forming a metal layer on the second surface of the spacing layer. And, the method comprises applying a second adhesive layer and a liner to the metal layer to thereby form the laminate.

In still another aspect, the present subject matter provides a method for producing a vinyl film. The method comprises forming a layer of a vinyl composition in liquid form (also called an organisol) on a substrate. The organisol includes polyvinyl chloride (PVC), at least one plasticizer, at least one UV stabilizer, at least one heat stabilizer, and at least one print enhancing additive. The method also comprises heating the layer of the organisol to a first temperature within a range of from 250° F. to 350° F. for a residence time of from 10 seconds to 2 minutes to thereby form an intermediate vinyl layer. And, the method additionally comprises heating the intermediate vinyl layer to a second temperature within a range of from 350° F. to 450° F. for a residence time of from 15 seconds to 3 minutes to thereby form the vinyl film.

As will be realized, the subject matter described herein is capable of other and different embodiments and its several details are capable of modifications in various respects, all without departing from the claimed subject matter. Accordingly, the drawings and description are to be regarded as illustrative and not restrictive.

DETAILED DESCRIPTION OF THE EMBODIMENTS

Figure 1:
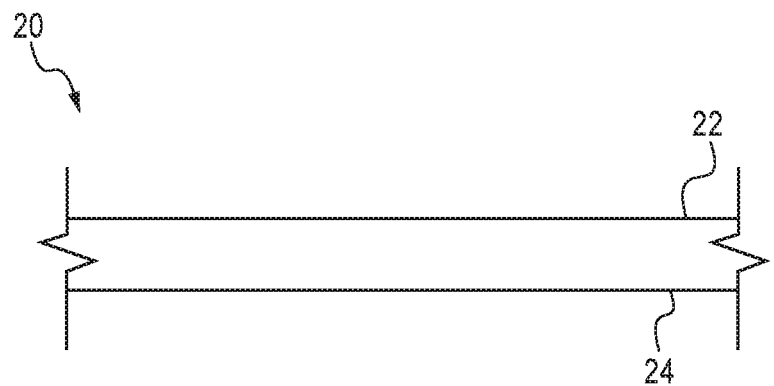
FIG. 1 is a schematic cross sectional view of an embodiment of a vinyl film in accordance with the present subject matter.

The present subject matter provides flexible vinyl films with improved properties including improved printability and weather stability. The vinyl films are formed from composition(s) that include one or more PVC resins, at least one plasticizer, at least one UV stabilizer, at least one heat stabilizer, and at least one print additive. In many embodiments, the vinyl compositions can be further improved by modifying the relationship between components in the formulation. In some applications, it may be beneficial to reduce the solubility between components. However, in other applications, optimizing the solubility may be desired. Hansen Solubility Parameters (HSP) were developed for evaluating various component options. These aspects are described in greater detail herein.

The present subject matter also provides laminates utilizing the vinyl films and particularly those described herein. Generally, the laminates include a vinyl layer, a first adhesive layer proximate the vinyl layer, a spacing layer, a region of optical components which can for example be in the form of glass beads dispersed between the first adhesive layer and the spacing layer, and a metalized layer. The vinyl layer is formed from the organisols described herein. The laminates can additionally include a layer of a second adhesive typically covering the metalized layer, and a liner disposed on the second adhesive layer. These laminates, variations thereof, and additional products are described herein.

The present subject matter further provides methods of producing the noted laminates and/or vinyl films. The vinyl films can be produced using a variety of techniques and particularly using an organisol casting process. These and other aspects of the present subject matter are described herein.

I. Vinyl Compositions and Vinyl Films

As noted, the vinyl compositions and vinyl films of the present subject matter comprise one or more PVC resins, at least one plasticizer, at least one UV stabilizer, at least one heat stabilizer, and at least one print enhancing additive. Each of these components is described in greater detail as follows.

Polyvinyl Chloride Resins

A wide array of PVC resins(s) can be used in the vinyl compositions and vinyl films of the present subject matter. Polyvinyl chloride is a thermoplastic polymer having a chemical formula $(C_2H_3Cl)_n$. In many embodiments, the molecular weight of the PVC resin(s) used in the vinyl compositions is in a range of from about 25,000 to about 250,000. However, it will be understood that the present subject matter includes the use of PVC resins having molecular weights outside of this range.

One or more PVC resins may be used. If multiple resins are used, they are typically blended with one another to form a homogenous blended resin composition. In certain embodiments, a particular combination of polyvinyl chloride resins are utilized in the vinyl compositions and/or vinyl layers of the present subject matter. For example, in one embodiment, a blend of a low molecular weight PVC resin, an intermediate molecular weight PVC resin, and a high molecular weight PVC resin is utilized. These terms "low molecular weight," "intermediate molecular weight," and "high molecular weight" refer to PVC resins having K-values and/or molecular weights as follows.

TABLE 1

PVC Resins for Use in Vinyl Compositions and Vinyl Layers

| PVC Resin | Typical K-Values | Particular K-Value | Typical Molecular Weights | Particular Molecular Weights |
|---|---|---|---|---|
| Low Molecular Weight | 48-72 | 68 | 34,700-101,900 | 87,600 |
| Intermediate Molecular Weight | 72-80 | 76 | 102,000-134,800 | 117,700 |
| High Molecular Weight | 80-92 | 83 | 134,900-195,500 | 148,700 |

K-values, as known in the art, are an indication of average molecular weight of a polymeric sample or resin. K-values are a measure of molecular weight based on viscosity measurements, and are described in greater detail in "Encyclopedia of Polymer Science and Technology," Vol. 14, John Wiley & Sons (1971): and "Molecular Weight and Solution Viscosity Characterization of PVC," Skillicorn, D. E., Perkins, G. G. A., Slark, A., and Dawkins, J. V., Journal of Vinyl Technology, June 1993, Vol. 15, No. 2, Page 107.

The K-values noted in Table 1 above, are merely representative in nature and in no way limit the range or type of PVC resins, or combination of resins, that can be utilized in the PVC compositions and vinyl films or layers of the present subject matter.

In certain embodiments, a blend of a low molecular weight PVC resin, an intermediate molecular weight PVC resin, and a high molecular weight PVC resin is used to provide a relatively high initial reflectivity of a laminate as described herein, as compared to a corresponding laminate utilizing a vinyl layer with a single PVC resin. In addition, in many embodiments, vinyl layers utilizing a blend of a low molecular weight PVC resin, an intermediate molecular weight PVC resin, and a high molecular weight PVC resin exhibit desirable low modulus, and an acceptable low extent of shrinkage.

A variety of PVC resins can be used for the low, intermediate, and high molecular weight PVC resins. Many of these resins are commercially available as follows. Nonlimiting examples of the high molecular weight PVC resin include Mexichem Vestolit G171, Formosa Formolon F-NVW, and SCG Chemicals PG770. Nonlimiting examples of the intermediate molecular weight PVC resin include Mexichem Vestolit G178, Formosa Formolon-1071, and SCG Chemicals PG740. Nonlimiting examples of the low molecular weight PVC resin include Mexichem Vestolit G173, Formosa Formolon-24A, and SCG Chemicals PG620. It will be understood that the present subject matter is not limited to any of these PVC resins and may include other PVC resins.

In certain embodiments, when utilizing a blend of low, intermediate, and high molecular weight PVC resins, it may be beneficial to utilize the combination of PVC resins in particular weight ratios to each other. Representative weight amounts of these PVC resins are listed in Table 3 herein. It will be understood that the present subject matter is not limited to the use of PVC resins in the noted amounts or weight ratios, and instead includes other amounts, proportions, and/or weight ratios of PVC resin(s).

In certain embodiments, the PVC resin(s) exhibit a relatively low plasticizer solubility which impedes migration of one or more components and particularly protective additives in the composition.

In certain embodiments, the PVC resin(s) also exhibit a high solvent solubility.

In certain embodiments, a high-molecular weight PVC is used to impede the migration of one or more components and particularly protective additives in the vinyl composition. This PVC resin can also be less soluble with the plasticizer(s), thus promoting the plasticizer to function on the surface of the PVC molecule. This PVC can also be more compatible with the solvent(s) used in the composition.

These and other aspects are described in greater detail herein under the Examples section in which various PVC resins are evaluated using Hansen Solubility Parameters and elongation at break.

Plasticizer(s)

A wide array of plasticizer(s) can be used in the vinyl compositions and vinyl films of the present subject matter.

In certain embodiments, the plasticizer(s) selected is bio-based. The term "bio-based" as used herein refers to a plasticizer that includes or is formed from biological products or renewable agricultural materials including plant, animal, and/or marine materials. An example of a bio-based plasticizer is a plasticizer prepared from soybeans, corn, and/or other agricultural products for example. Another example of a bio-based plasticizer is a plasticizer made from natural oils and fats. Typically, bio-based plasticizers exhibit better biodegradability as compared to non-bio-based plasticizers due to the presence of epoxides. In particular embodiments the bio-based plasticizer(s) has an inherent heat stabilizing property, but has less solubility with other additives and/or components of the composition. Although a monomeric plasticizer can be used in certain embodiments, due to its low molecular weight, monomeric plasticizers are typically not used for long-term weathering applications. Thus, more complex polymeric plasticizers with higher molecular weights are used in the vinyl compositions in accordance with the present subject matter.

Non-limiting examples of commercially available bio-based plasticizer(s) which can be used in the vinyl compositions include Drapex® Alpha 200, Drapex® Alpha 200C, Drapex® Alpha 210, and Drapex® Alpha 220 available from Galata; Edenol® D 81, Edenol® D 82 S, Edenol® B 316 Spezial, Edenol® 1234, Edenol® 9789, Edenol® 1208, and Edenol® 1233 Spezial available from Emery Oleochemicals; Polysorb® ID available from Roquette; Oxblue® DOSX and Oxblue® ABTC available from Oxea; DOSX available from Myriant; and Proviplast® 1044, Proviplast® 2644, Proviplast® 01422, Proviplast® PLS Green 5, and Proviplast® PLS Green 8 available from Proviron. It will be understood that the present subject matter is not limited to any of these plasticizers, and may use other plasticizers.

In many embodiments, the plasticizer(s) used in the vinyl compositions exhibit a relatively high degree of incompatibility and/or are insoluble with respect to water. A preferred class of plasticizers are those derived from adipic acid and polyhydric alcohols. A nonlimiting example of such plasticizer is Palamoll® 656 (CAS No. 208945-12-4), commercially available from BASF.

In particular applications, it has been found that using a higher molecular weight plasticizer leads to an improved and lower permeation rates of water vapor transmission rate (WVTR) and oxygen transmission rates (OTR) of a resulting vinyl film. High WVTRs of vinyl films are believed to contribute to degradation of metal substrates upon which a vinyl film is disposed by the transport of metal ions that can unzip the vinyl molecule. The degradation of the vinyl produces hydrochloric acid (HCl). Both the metal ions and the HCl can interact and consume with the metal layer. Once the metal layer is consumed or distorted, the retro-reflectivity of the construction is compromised. High OTR contributes to oxidative degradation of vinyl films. In the presence of UV radiation, photo-oxidation occurs, producing carbon dioxide ($CO_2$). Once this occurs, the vinyl film breaks down, forming HCl. Thus, for many embodiments, using a relatively high molecular weight plasticizer reduces WVTR and OTR through the vinyl film, thereby reducing potential for degradation of an underlying metal substrate.

However, it has also been found that relatively high water vapor transmission rates of a vinyl film allow beneficial absorption of printing composition(s) into the vinyl film. Thus, for many of the vinyl films and laminates of the present subject matter, it is desirable that the vinyl films and layers exhibit some degree of moisture permeability particularly to solvent inks of a printing composition.

In certain embodiments, the plasticizer(s) exhibits heat stabilizing properties.

In certain embodiments, the plasticizer(s) exhibits low solubility with other additives and/or components of the vinyl composition.

These and other aspects are described in greater detail herein under the Examples section in which various plasticizers are evaluated using Hansen Solubility Parameters.

Acid Scavengers

A variety of acid scavengers can be used in the vinyl compositions and vinyl films of the present subject matter. It is presumed that the eventual degradation of the vinyl film is inevitable. Once the HCl starts to form, the rate of vinyl degradation is exponential. Acid scavengers are used to counteract the initial formation of HCl and thus prolong the life of the retro-reflective article.

Epoxides are the most common type of acid scavenger used in vinyl films. Epoxides are cyclic ethers with a three atom ring. In many embodiments, use of one or more epoxide(s) in the vinyl compositions has been found to promote various properties and characteristics of vinyl films and laminates using the vinyl compositions. In certain applications, epoxides provide the dual functionality of acting as a plasticizer and an acid scavenger. This improves the flexibility of the vinyl film and enhances the heat stability by delaying the onset of degradation from thermal sources.

However, incorporation of epoxides in the vinyl composition also results in reduction in reflectivity and/or other undesirable optical properties of the vinyl films and laminates. The epoxides are migratory and can migrate into and plasticize the spacing layer. Once the spacing layer is plasticized, it can be more easily deformed by high heat. Once the spacing layer is deformed, the metal layer no longer functions to create a retro-reflective product.

There are other methods to scavenge acids, however, many are solid particles such as hydrotalcites. For retro-reflective materials, it is desired to avoid anything between the metal layer and the outer surface of the vinyl layer that may defract or diffuse light. Solid acid scavengers defract too much light to be useful. The ideal candidate is a compatible liquid with a low refractive index. BASF has shown that 1-methylimidazole is a useful liquid acid scavenger.

UV Stabilizers

An array of UV stabilizer(s) can be used in the vinyl compositions and vinyl films of the present subject matter. The most common types of UV stabilizers are cyanoacrylates, benzophenones, benzotriazoles, triazines and oxanilides. It has been discovered that certain UV stabilizers are migratory—detrimentally affecting physical properties of resulting vinyl films and laminates: others have unexpected plasticizing properties which are lost if the UV stabilizer is not stable in the vinyl film. Accordingly, certain embodiments of the present subject matter utilize one or more particular UV stabilizers that have been discovered to avoid reductions in physical properties, and may lead to improved properties.

In particular embodiments, the UV stabilizer(s) are oxanilide or oxanilide-based compounds. A preferred UV stabilizer of this type is available commercially from various sources under the designation Hostavin 3206 and/or Hostavin VSU. Another preferred oxanide UV absorber is Tinuvin 312 available from BASF.

Another preferred UV stabilizer is an oligomeric hindered amine light stabilizer (HALS) and also commercially available under the designation Hostavin N30. Additional examples of hindered amine light stabilizers which are commercially available and which can be used in the vinyl compositions include Hostavin 3068; Tinuvin 123 and 292; and Uvasorb HA10 and HA88FD. The Hostavin agents are available from Clariant. The Tinuvin agents are available from BASF. And the Uvasorb agents are available from 3V. It is also contemplated that Tinuvin 1600 which is a triazine, can be used as a suitable UV stabilizer in the vinyl compositions. The HALS are used as enhancers to a primary UV stabilizer. The UV stabilizer to HALS ratio can range from 9:1 to 6:4. Combinations of any of these UV stabilizers and HALS can be used.

These and other aspects are described in greater detail herein under the Examples section in which various UV stabilizers are evaluated using Hansen Solubility Parameters elongation at break, Young's Modulus, and Delta E of a Super UV Test.

Heat Stabilizer(s)

A variety of heat stabilizer(s) can be used in the vinyl compositions and vinyl films of the present subject matter. Many of the heat stabilizers include barium (Ba) and zinc (Zn). For these versions, an increased Ba/Zn ratio has been found to reduce one or more detrimental effects that may arise when utilizing other heat stabilizers.

In particular embodiments, it has been discovered that selecting a heat stabilizer that is relatively incompatible in terms of solubility with the plasticizer(s) used in the vinyl compositions leads to improved performance of the resulting vinyl films and/or laminates.

In certain embodiments using heat stabilizers that include both barium and zinc, i.e., "barium-zinc heat stabilizers" as referred to herein, it is preferred to utilize stabilizer(s) having a molar ratio of Ba/Zn which is greater than 3.85:1, and in certain versions greater than 4:1, respectively. In certain applications, suitable heat stabilizer(s) may include phosphorus (P).

Examples of commercially available heat stabilizers that have been found to promote improved performance of the vinyl films and laminates include Mark 4887 and Mark 4825 available from Galata Chemicals. Mark 4887 and Mark 4825 are both barium-zinc heat stabilizers. A variety of other and potentially useful heat stabilizers are available from other suppliers including for example Valtris Specialty Chemicals, Adeka, Baerlocher, Reagens, Kolon Industries, and Halstab. However, it will be appreciated that the present subject matter is not limited to any of these heat stabilizers, and may instead utilize one or more other heat stabilizer(s).

For barium-zinc heat stabilizers, it was found that selecting a heat stabilizer with a higher barium content improves solvent ink dot diameter. And selecting a heat stabilizer with a lower zinc content tends to reduce the solvent ink dot diameter, and have a greater impact than a higher barium content. Thus, for a heat stabilizer containing two metals and particularly for barium-zinc heat stabilizers, the noted ratios of barium to zinc described herein have been discovered to surprisingly produce vinyl films and laminates with excellent characteristics.

These and other aspects are described in greater detail herein under the Examples section in which various heat stabilizers are evaluated using Hansen Solubility Parameters and ink dot diameter studies.

Print Enhancing Additive(s)

A wide array of print enhancing additive(s) can be used in the vinyl compositions and vinyl films of the present subject matter. Nonlimiting examples of print enhancing additive(s) include surfactant(s), polydimethyl siloxane(s), and/or other agent(s). Combinations of one or more of these agents can be used.

The vinyl compositions may also comprise one or more surfactants. Surfactant(s) may be utilized in the vinyl compositions to improve properties of the resulting vinyl films. Nonlimiting examples of potentially suitable surfactants include BYK-3560, DISPERBYK, DISPERBYK-2200, and BYK-4512 available from BYK Additives and Instruments; Dispex® Ultra PA 4512 available from BASF; and Disparlon® LF-1985, Disparlon® LPH-810, Disparlon® SPL-85, Disparlon® UVX35, and Disparlon® UVX-36 available from Kusumoto Chemicals.

The vinyl compositions may also comprise one or more polydimethyl siloxane(s), which are typically known in the art as PDMS. Although a wide array of PDMS agents can potentially be used in the vinyl compositions, in many embodiments it is preferred that the PDMS exhibits a viscosity greater than 40 cSt. Nonlimiting examples of potentially suitable PDMS agents include DMS-S15, DMS-S21, and DMS-S27 available from Gelest; Xiameter OFX-5211 and Xiameter PMX-0156 available from Dow Corning; PSF-50 cSt, and PSF-100 cSt available from ClearCo; and PDMS agents available from Sigma Aldrich. (this is the same as DMS-S15) In certain applications, it has been found that selection and use of certain print enhancing additives as described herein leads to improved circularity of print dots. For example, using a polyacrylate-based surfactant improves dot circularity as compared to a vinyl composition free of such agent. Use of polydimethyl siloxane in a vinyl composition improves uniformity of print dots. Utilizing both of these agents has been discovered to produce print dots having improved dot shape and size as compared to the use of vinyl compositions containing only one of these agents.

These and other aspects are described in greater detail herein under the Examples section in which various print additives are evaluated using Hansen Solubility Parameters and ink dot diameter studies.

Additional Aspects

In certain embodiments, the heat stabilizer, UV stabilizer and acid scavenger, are all selected so that they exhibit improved compatibility, and in certain versions optimal compatibility with each other, and the solvent. In certain embodiments, the Ba/Zn ratio of the heat stabilizer can be increased to reduce the negative impact on printing. In certain embodiments, a hindered-amine light stabilizer (HALS) is utilized and added to the UV stabilizing package. The HALS is typically a solid that is less soluble in the solvent, which will ensure that some UV protection remains in the vinyl. However, for retro-reflective products, a liquid HALS is preferred when available. A higher molecular weight acid scavenger can also be used.

In particular embodiments, a surfactant and PDMS combination is utilized for improved printability. A series of mixture designs found that a surfactant/PDMS weight ratio of 4.8:1, respectively, produced the optimal dot diameter for digital solvent printing. Evaluation of dot diameters is described in the Examples section herein. In certain embodiments, the overall concentration of surfactant and PDMS does not exceed 1.60% by weight in the final vinyl film.

The resultant vinyl composition is more weatherable, thus delaying the generation of product-killing acid. The tailored solubility of the additives, combined with the higher molecular weight of the PVC, reduces migration of key additives to the surface that would be deleterious to printing and adhesion to a urethane bonding layer used in many laminate products. The resulting product is clear and glossy, as desired, and the resulting product exhibits improved solvent digital printability.

The vinyl compositions may comprise one or more light stabilizer(s), and particularly one or more hindered amine light stabilizer(s) or HALS as known in the art. These are typically in addition to the UV stabilizers previously noted. In many versions these agents are in solid form at ambient conditions. Moreover, in many embodiments the HALS exhibit low solvent solubility to impede migration of components or additives in the vinyl composition.

In particular embodiments, the vinyl compositions and/or vinyl films comprise particular amounts and/or weight proportions of the noted components. Tables 2 and 3 summarize various embodiments of vinyl compositions (in film form and without solvent) in accordance with the present subject matter.

TABLE 2

Representative Embodiments of Vinyl Composition

| Component | Typical Range (wt %) |
|---|---|
| Vinyl Resin(s) | 30-85 |
| Plasticizer(s) | 15-50 |
| Acid Scavenger | 0.1-10 |
| UV Stabilizer(s) | 0.1-15 |
| Heat Stabilizer(s) | 0.1-10 |
| Print Enhancing Additive(s) | 0.1-5 |

TABLE 3

Particular Embodiments of Vinyl Composition

| Components | Typical (parts by weight) |
|---|---|
| Vinyl Resin(s) | |
| Low MW | 15-60 |
| Intermediate MW | 15-60 |
| High MW | 40-90 |
| Plasticizer(s) | 20-90 |
| Acid Scavenger | 0.1-10 |
| UV Stabilizer(s) | 0.1-15 |

TABLE 3-continued

Particular Embodiments of Vinyl Composition

| Components | Typical (parts by weight) |
|---|---|
| Heat Stabilizer(s) | 0.1-10 |
| Print Enhancing Additive(s) | 0.1-10 |

Solvent(s) and/or Diluent(s)

The vinyl compositions can include one or more solvent(s). A wide array of solvents can be used, many of which are commercially available such as HiSol 10 and Aromatic 100, both of which are blends of various petroleum distillates. Incorporation of solvent(s) in the vinyl composition promote blending and mixing of components, application of the composition, and/or formation of a vinyl layer or film. The solvent(s) are typically removed from the composition during drying, curing, and/or layer formation.

II. Laminates

The present subject matter also provides a wide array of products utilizing the vinyl films. In many embodiments, the products are reflective film products. Many such reflective products include one or more regions or layers of adhesive such as pressure sensitive adhesive(s). In addition, many reflective products include one or more reflective layer(s) or region(s) disposed between the adhesive layer(s) and the vinyl film(s). The reflective layer(s) may include a variety of optical components or agents, such as but not limited to glass beads. These and other aspects are described in greater detail herein.

FIG. 1 is a schematic cross sectional view of an embodiment of a vinyl film 20 in accordance with the present subject matter. The film 20 is formed from the vinyl compositions of the present subject matter. The film defines a first face 22 and an oppositely directed second face 24. Typically, the thickness or gauge of the film is within a range of from 1.20 mils (30.5 microns) to 2.00 mils (50.8 microns), and in many embodiments about 1.50 mils (38.1 microns). However, it will be understood that the present subject matter includes vinyl films having thicknesses outside of this range. If the vinyl film is too thin, the resulting reduction in modulus and tensile strength may render the film susceptible to breaking or tearing when removing or otherwise processing or using. If the tensile strength is too low, the matrix also breaks easily when performing post film processing operations such as "weeding" sign cut letters. The noted maximum thickness of the vinyl film achieves a good balance between conformability and strength of the film. Thicknesses greater than that noted herein may exhibit unacceptable conformability characteristics.

Figure 2:
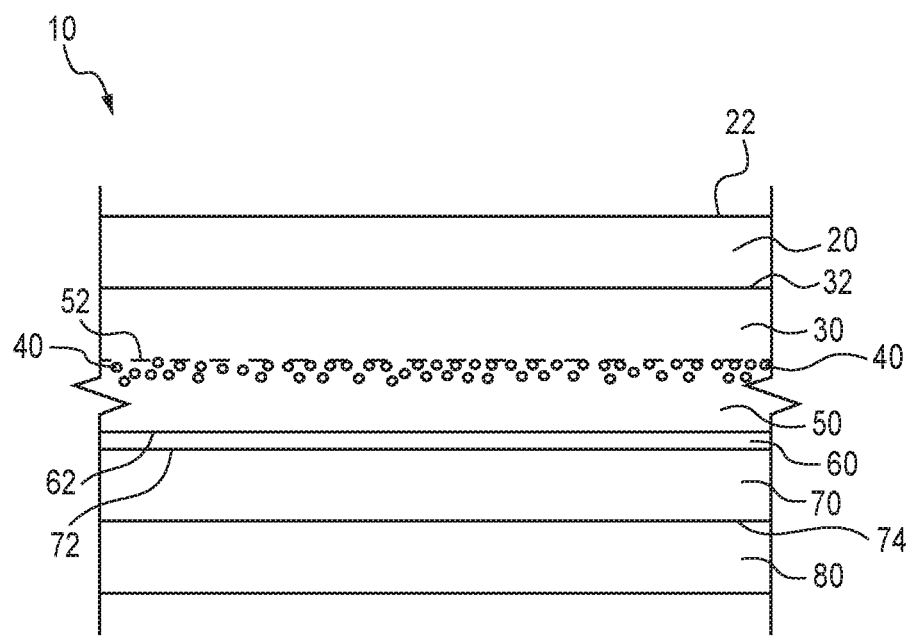
FIG. 2 is a schematic cross sectional view of an embodiment of a vinyl-based laminate in accordance with the present subject matter.

FIG. 2 is a schematic cross sectional view of an embodiment of a vinyl laminate 10 in accordance with the present subject matter. The laminate 10 comprises a vinyl film 20 as previously described, and one or more additional layers as described herein.

In particular embodiments, the laminate 10 comprises a vinyl film 20 as previously described herein, a first adhesive layer 30 which typically includes a urethane adhesive or a pressure sensitive adhesive (PSA), a spacing layer 50 within which are dispersed optical components 40 which can be glass beads for example, a metal layer 60, a second adhesive layer 70 which typically includes a solvent-based pressure sensitive adhesive, and an optional liner 80. Although the present subject matter laminates can include nearly any arrangement of these layers and potentially combined with other layers and components, a preferred arrangement is depicted in FIG. 2. The vinyl layer 20 is disposed on an outer face 32 of the first adhesive layer 30. The outer face 22 of the vinyl layer 20 may optionally receive one or more additional layers or coatings thereon. The outer face 22 of the vinyl layer 20 and/or additional layers thereon may receive print regions, text, and/or indicia. The first adhesive layer 30 is disposed on an outer face 52 of the spacing layer 50 and thus may also be disposed on a portion of the optical components 40 dispersed within the spacing layer 50. The encapsulation of the optical components is controlled such that the glass beads are deep enough into the spacing layer without being too deep. This placement is critical to optimize the reflectivity of the product. The collection of optical components 40 constitutes the optical region or layer of the laminate 10. The spacing layer 50 is disposed on an outer face 62 of the metal layer 60. The metal layer 60 is disposed on an outer face 72 of the second adhesive layer 70. And the liner 80 is disposed on another outer face 74 of the second adhesive layer 70. The outer faces 72 and 74 of the second adhesive layer 70 are oppositely directed from one another. Each of these layers, regions, and/or components besides the previously described vinyl film, is described in greater detail as follows.

Spacing Layer

The laminates of the present subject matter typically comprise a spacing layer disposed between the optical layer/region and the metal layer. An example of such a spacing layer is layer 50 in the laminate 10 of FIG. 2. The spacing layer serves to retain and affix the optical layer and/or optical components of that layer or region. The spacing layer also serves to appropriately space the optical component(s) from the metal layer and/or space the optical component(s) from the outer surface of the laminate, such as the outer face 22 depicted in FIG. 2. The resins that may be used for the spacing layer include a variety of partially amorphous or semi-crystalline thermoplastic polymers which are transparent or substantially so, and generally have a soft stage during which the optical components can be embedded in the spacing layer.

Preferably, the adhesion between the spacing layer and adjacent layers or materials is greater than the tensile strength of the materials. Acrylics, polyvinyl butyrals (PVBs), aliphatic urethanes and polyesters are particularly useful polymeric materials for the spacing layer because of their outdoor stability. Copolymers of ethylene and an acrylic acid or methacrylic acid, vinyls, fluoropolymers, polyethylenes, cellulose acetate butyrate, polycarbonates and polyacrylates are other examples of polymers or polymeric materials that can be used for the spacing layers in the laminates of the present subject matter. Combinations of these components can be used.

In many embodiments, the material used in the spacing layer is polyvinyl butyrate (PVB). In certain embodiments, the PVB used is commercially available such as Butvar B-90 from Solutia.

Optical Component(s)

The laminates of the present subject matter also comprise at least one layer or region of optical component(s) such as components 40 in the laminate 10 of FIG. 2. The layer(s) or region(s) constituting the optical components are typically embedded within or along a portion, and typically along a face, of the spacing layer. The optical components are typically transparent or substantially so, and in the form of microspheres having certain refractive indexes.

The optical components utilized in the laminates, if in a particulate form, may be characterized as having average diameters in a range of from about 25 to about 300 microns, 30 to about 120 microns, and more often in a range from about 40 to about 80 microns. The index of refraction of the optical components is generally in a range from about 1.9 to about 2.5, more typically is in the range from about 2.0 to about 2.3, and most often between about 2.10 to about 2.25.

Glass microspheres are typically used for the optical components, although ceramic microspheres such as those made by soligel techniques can also be used. The index of refraction and the average diameter of the microspheres, and the index of refraction of other layers and spacing layer dictate the thickness of the spacing layer. The microspheres can be subjected to chemical or physical treatments to improve the bond of the microspheres to the layers and or regions of the laminates. For example, the microspheres can be treated with a fluorocarbon or an adhesion promoting agent such as an aminosilane to improve the bond, or the spacing layer in which the microspheres have been embedded can be subjected to a flame treatment or corona discharge to improve the bond between the spacing layer and microspheres to any adjacent layers.

The present subject matter includes one or more prismatic structures instead of, in combination with, the noted glass microspheres or other particulate optical components. Thus, it will be understood that the present subject matter includes a wide array of optical components that can be used in the laminates and/or reflective products.

Metal Layer

The laminates of the present subject matter also comprise at least one metal layer such as layer 60 in the laminate 10 of FIG. 2. Typically, this metal layer includes a reflective metal such as silver or aluminum.

The metal is typically applied by evaporative methods (thermal or electron beam) or by cathodic sputtering (magnetron or reactive) over the second surface of the spacing layer. The thickness of the reflective layer depends on the particular metal used and is generally between about 500 and 1,000 nanometers. However, it will be understood that the present subject matter includes a wide array of variations for this layer.

Adhesives

In many embodiments, the laminates of the present subject matter include one or more layers or regions of adhesive. In many embodiments of the laminates, the first layer of adhesive, i.e., layer 30 depicted in FIG. 2, includes one or more structural adhesives. An example of such a material includes, but is not limited to, urethane adhesives. However, pressure sensitive adhesives with suitable bond strength and refractive index may also be suitable as a first layer adhesive. As noted, in many versions the adhesives used in the second layer of adhesive, i.e., layer 70 depicted in FIG. 2, include pressure sensitive adhesive(s).

The first adhesive layer used in the laminates is typically disposed between a vinyl film or layer, and the noted spacing layer. As noted, in many embodiments, the first adhesive layer includes one or more urethane adhesives. In many formulations, the urethane adhesive is prepared by combining a polyol component and an isocyanate component with optional crosslinker(s). In many of the urethane adhesives identified for use in the present subject matter, it was discovered that crosslinking and/or chemical bonding with certain functional groups in the adjacent vinyl layer, such as —OH groups, particularly those in the plasticizer(s) in the vinyl layer, leads to improved adhesion and physical affixment between the vinyl layer and the first adhesive layer.

Nearly any pressure sensitive adhesive (PSA) composition known in the art can be used in the present subject matter laminates. Such adhesive compositions are described in, for example, "Adhesion and Bonding," Encyclopedia of Polymer Science and Engineering, Vol. 1, pp. 476-546, Interscience Publishers, Second Ed., 1985. Such compositions generally contain an adhesive polymer such as natural or reclaimed rubbers, styrene-butadiene rubber, styrene-butadiene or styrene-isoprene block copolymers, polyisobutylene, poly(vinylether) or poly(acrylic)ester as a major constituent. Other materials may be included in the pressure sensitive adhesive composition such as resin tackifiers including rosin esters, oil-soluble phenolics and polyterpenes; antioxidants; plasticizers such as mineral oil or liquid polyisobutylene. Fillers are not used in the first layer adhesive in highly reflective articles, as this can scatter light and reduce the retro-reflectivity of the article. Fillers can be used in applications that are limited to a maximum reflectivity. The selection of the pressure sensitive adhesive to be used in any laminates of the subject matter is not critical, and those skilled in the art are familiar with many suitable pressure sensitive adhesives for particular applications.

Either or both of the first and/or second adhesive layers may be patterned. Either or both of these layers can optionally include one or more non-continuous regions of adhesive and/or include regions that are free of adhesive.

It will be appreciated that each of the above described adhesives may be provided as solvent based, emulsions, hotmelt adhesives, UV curable, or radiation curable. Additionally, each of the adhesives may be made removable or permanent. The system and performance characteristic of the adhesives may be selected as desired for a particular purpose or intended use.

Release Liners

In many embodiments, the vinyl-based laminates of the present subject matter include one or more release liners. The liners typically cover or overlie otherwise exposed faces or regions of the second adhesive, which is typically a PSA.

Release coated liners useful in the laminates of the present subject matter may comprise a release coated laminate comprising more than one sheet material including alternating layers of paper and polymer to provide desirable properties. The following examples of laminates illustrate these types of laminates which may be utilized as the release-coated liners in the laminates of the present subject matter: release composition/polyethylene/paper; release composition/paper/polyethylene; release composition/polyvinyl-chloride/paper; release composition/polyethylene/paper/polyethylene/tissue; etc. In these examples of release coated liners, the polyethylene films may range from low density to high density, and the paper materials may be any paper materials.

As previously noted, FIG. 2 depicts a preferred arrangement of layers and components in a laminate of the present subject matter. However, it will be understood that the present subject matter includes other arrangements and/or configurations. In one embodiment of a laminate of the present subject matter, a variety of layer arrangements can be used so long as at least a portion of the spacing layer is disposed between the optical components and the metal layer. In another embodiment, the laminate features the first adhesive layer disposed between the vinyl film and at least one of (i) the optical components and (ii) the spacing layer. In another embodiment, the metal layer is disposed between the spacing layer and the second adhesive layer. In another embodiment, the vinyl film is disposed immediately adjacent to the first adhesive layer. In another embodiment, the optical components are disposed between the first adhesive layer and the metal layer. The present subject matter is not limited to any of these particular versions and includes laminates exhibiting combinations of these features and embodiments.

In many embodiments, the laminates include one or more layers and/or regions of print. The print or printing composition can be applied or otherwise deposited on the vinyl film or layer, or other layers of the laminate. It is also contemplated that one or more auxiliary layers such as top coats and over-laminate films can be applied to the vinyl layer and print then disposed on the top coat(s) or overlaminate films. The present subject matter also includes applying top coat(s), protective layer(s), or overlaminate films on the print surface of a laminate.

A wide array of print compositions can be used in association with the present subject matter. Many such compositions are known in the art and/or are commercially available. Nonlimiting examples of such print compositions include inks, coatings, paintings, and toner. The print compositions can be applied by known techniques. In many versions of the present subject matter, print composition(s) are applied directly to an outer face of the vinyl layer of a laminate. As described herein, as a result of characteristics of the vinyl layer, improved properties of the resulting printed layer, region, text, and/or design are attained.

The laminate structure may have a thickness as desired to provide a laminate having suitable characteristics and properties as desired for a particular purpose or intended use. In one embodiment, the laminate structure has an overall thickness of from about 1.5 mils to about 15 mils (about 35 microns to about 350 microns). In another embodiment, the laminate structure has an overall thickness of from about 3 mils to about 10 mils (about 70 microns to about 254 microns). In still another embodiment, the laminate structure has an overall thickness of from about 5 mils to about 8 mils (about 120 microns to about 205 microns).

III. Methods

Figure 3:
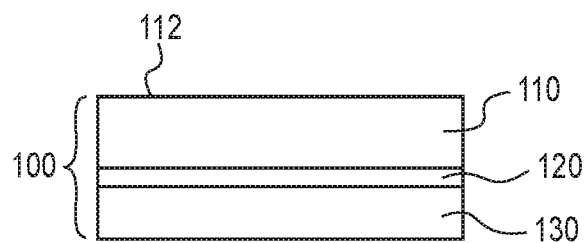
FIGS. 3-10 are schematic cross sectional views illustrating an embodiment of a process for producing a vinyl-based laminate in accordance with the present subject matter.

FIGS. 3-10 are schematic cross sectional views illustrating an embodiment of a method for producing a laminate in accordance with the present subject matter. FIG. 11 is a schematic flow diagram depicting this method 200. In FIG. 3, the method includes providing a carrier assembly 100 including a support layer 110 which can for example include polyethylene, a pigment layer 120 which more particularly is a metal pigment layer, and a liner 130 which can for example include a paper liner. The carrier assembly 100 defines an outer face 112 of the support layer 110. This operation is depicted as operation A in the method 200 shown in FIG. 11.

Figure 4:
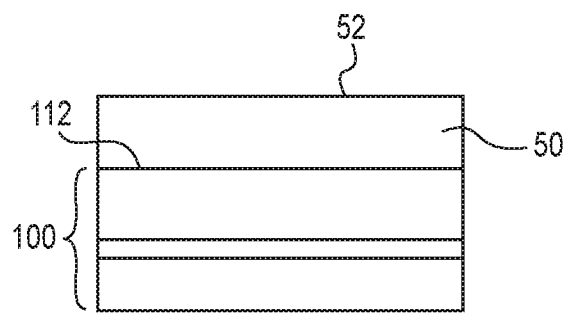

FIG. 4 shows formation of the spacing layer 50 on the outer face 112 of the carrier assembly 100. The spacing layer 50 can be formed by depositing, coating, or otherwise applying a suitable composition typically PVB, onto the outer face 112 by a wide array of techniques known in the art. Upon formation of the spacing layer 50, that layer defines the outer face 52 of the spacing layer 50. This operation or collection of operations is depicted in the method 200 of FIG. 11 as operation B.

Figure 5:
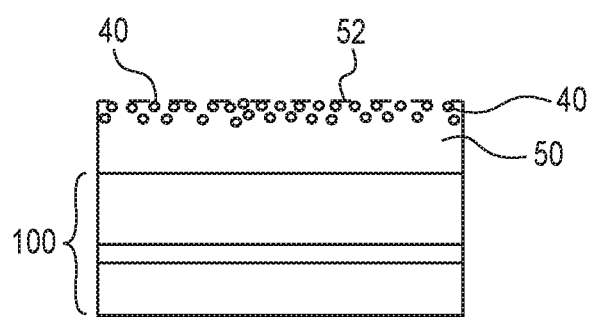

FIG. 5 illustrates incorporation of the optical components 40 such as glass beads along the outer face 52 of the spacing layer. In a particular technique, the spacing layer 50 is heated and a plurality of glass beads 40 is deposited along the outer face 52 of the spacing layer 50 to thereby coat and deposit the glass beads 40 along the outer surface 52 of the spacing layer 50. Due to heating of the spacing layer 50 or at least a portion of that layer adjacent the outer surface 52 of that layer, the glass beads 40 may be dispersed within the spacing layer 50 below the outer surface 52. Heating may be performed prior to, concurrently with, and/or after deposition of the glass beads 40 on the spacing layer 50. These operations are collectively shown in the method 200 of FIG. 11 as operation C.

Figure 6:
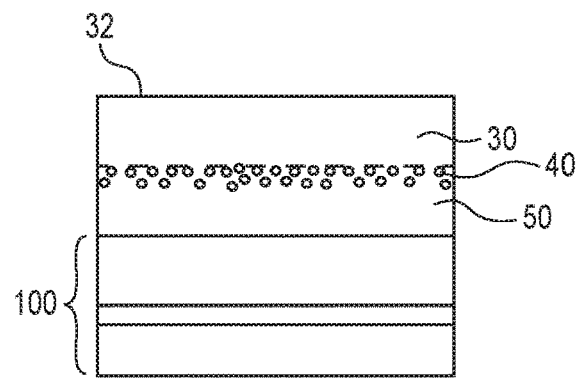

FIG. 6 illustrates formation of the first adhesive layer 30 which is typically a polyurethane adhesive on the spacing layer 50 having the optical components 40 dispersed thereon. After formation of the first adhesive layer 30, that layer defines the outer surface 32 of that layer. This operation is depicted as operation D in the method 200 shown in FIG. 11.

Figure 7:
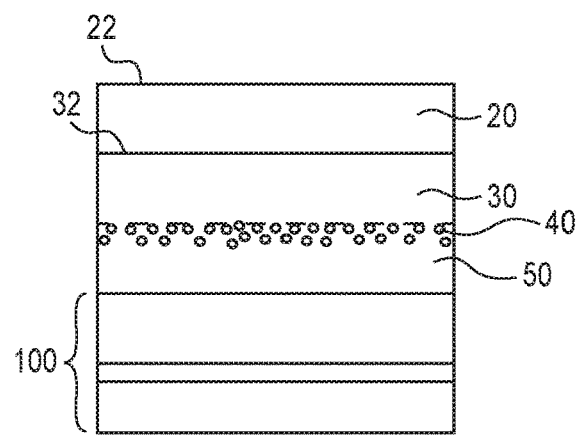

FIG. 7 illustrates formation of the vinyl layer 20 on the outer face 32 of the first adhesive layer 30. In many embodiments, a vinyl composition as described herein is applied, coated, or otherwise deposited on the outer face 32 of the first adhesive layer 30. Upon formation of the vinyl layer 20, that layer defines an outer face 22. This operation is shown as operation E in FIG. 11. The present subject matter also includes forming the vinyl film on a separate substrate and then applying the vinyl film to the first adhesive layer, or vice-versa.

Figure 8:
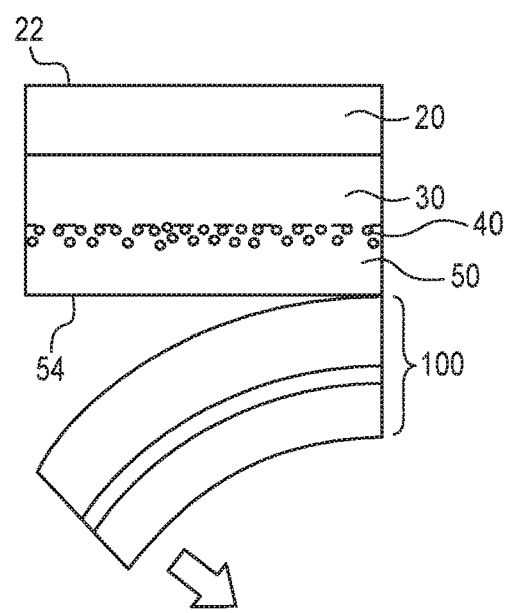

After formation of the vinyl layer 20 and/or completion of the assembly of layers 20, 30, and 50 with inclusion of the optical components 40; the carrier assembly 100 is removed as depicted in FIG. 8. Removal or separation of the carrier assembly 100 from the spacing layer 50 exposes an outer face 54 of the spacing layer 50. These operations are collectively designated as operation F in the method 200 of FIG. 11.

Figure 9:
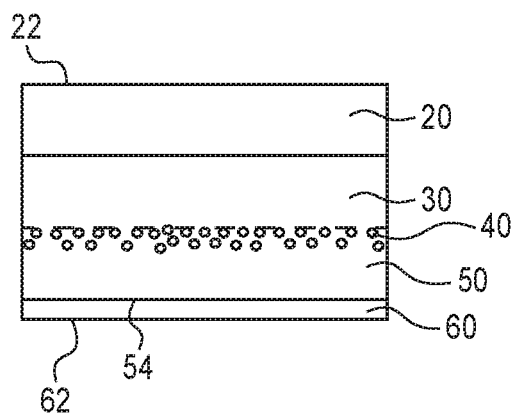

Upon exposure of the outer face 54 of the spacing layer 50, which typically occurs by removal of the carrier assembly 100; a layer of metal or reflective media 60, and particularly a metal layer is formed along the outer face 54 of the spacing layer 50. This is shown in FIG. 9. Upon formation of the metal layer 60, an outer face 62 results. A wide array of techniques can be used to form the metal layer 60 on the spacing layer 50, for example vapor deposition or cathodic sputtering. These operations are collectively shown as operation G in the method 200 of FIG. 11.

Figure 10:
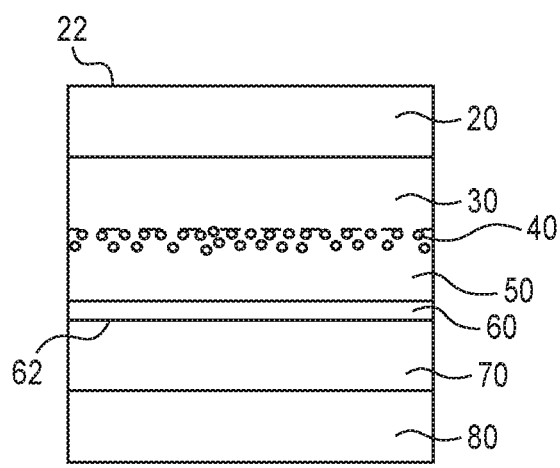
Figure 11:
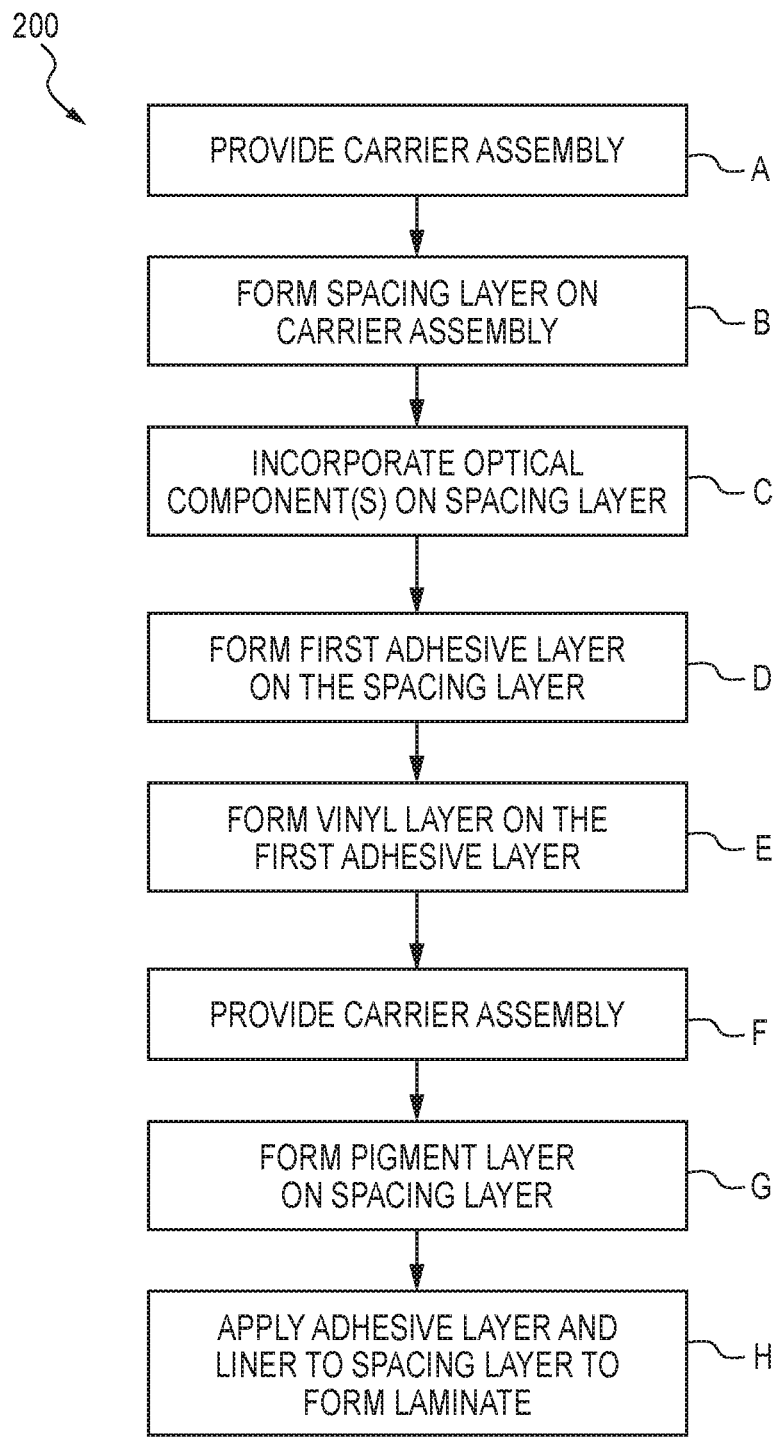
FIG. 11 is a schematic flow diagram depicting a process for producing a vinyl-based laminate in accordance with the present subject matter.

FIG. 10 illustrates application of the second adhesive layer 70, typically a solvent adhesive, and the liner 80 to the outer face 62 of the pigment layer 60. It will be understood that the second adhesive can be applied to the outer face 62 of the metal layer 60 and the liner 80 when applied to the second adhesive layer 70. Alternatively, the liner 80 may be coated or otherwise receive the second adhesive layer 70, and then be contacted with the outer face 62 of the metal layer 60. These operations are collectively shown as operation H in the method 200 of FIG. 11. Special coatings may be applied to the metal layer 60 to prevent oxidation and improve bonding to the second adhesive layer 70.

Figure 12:
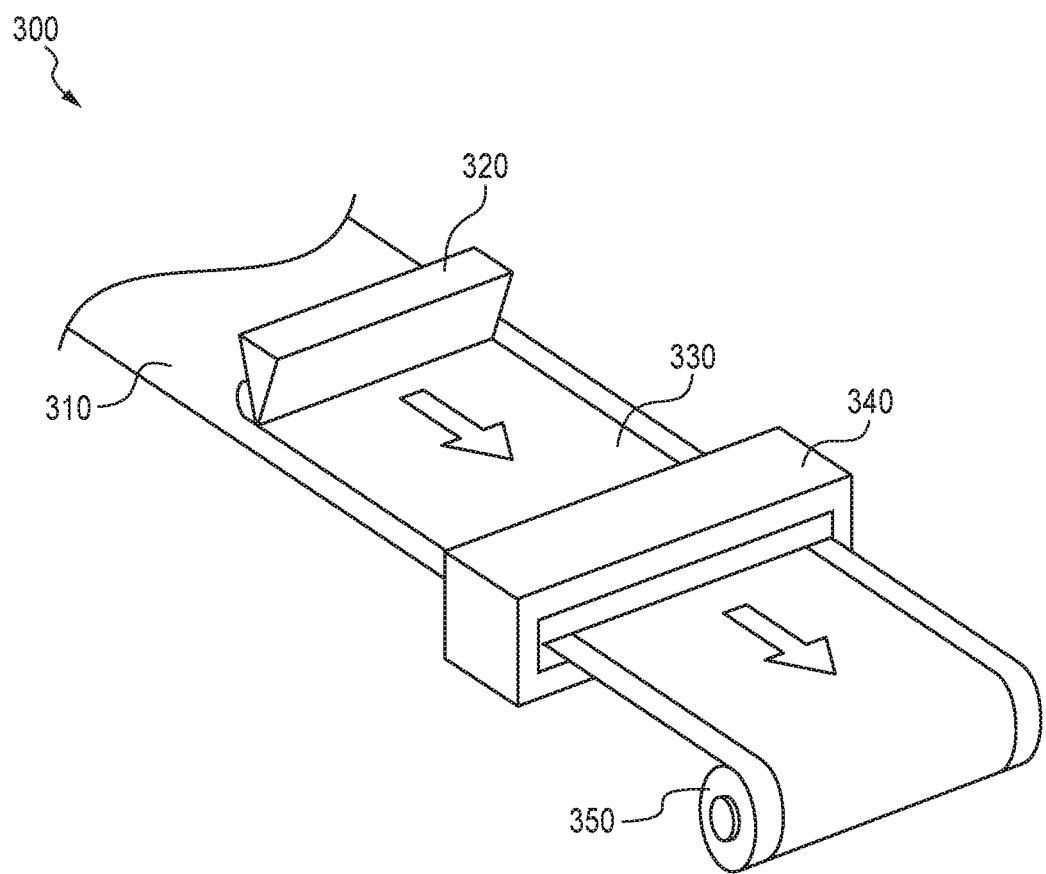
FIG. 12 is a schematic perspective view illustrating an embodiment for producing vinyl films in accordance with the present subject matter.

FIG. 12 is a schematic perspective view illustrating an embodiment for producing vinyl films in accordance with the present subject matter. FIG. 12 depicts production equipment 300 including a dispenser 320 for applying a layer 330 of vinyl composition as described herein, initially in a liquid form on a moving carrier web, belt, or other substrate 310. For example, the vinyl composition can be deposited on the outer face 32 of the first adhesive layer 30 of the method 200 depicted in FIG. 7. The liquid vinyl layer is passed within one or more heated region(s) or zone(s) typically provided by one or more oven(s) 340. The oven(s) heat the vinyl layer and solidify, dry, fuse, and/or cure the vinyl composition thereby forming the vinyl layer as described herein. Typically, any solvent(s) in the vinyl composition are removed.

After formation of the vinyl layer, the vinyl layer, if still residing on the carrier web 310, is collected on a windup roll 350.

In certain embodiments, prior to applying a layer of vinyl composition onto a substrate, it has been found beneficial dispense the liquid vinyl composition at a viscosity within a range of from about 650 to 1,300 centipoise. However, it will be understood that the present subject matter includes deposition of the vinyl composition at other viscosities and by other deposition techniques.

In particular embodiments, it has been discovered that improved heat stability of the resulting vinyl film can be obtained by utilizing certain temperatures and/or combination of temperatures in the formation of the vinyl films. For example, subjecting the vinyl composition, in layer form on a carrier web or belt or laminate, to a first temperature of from about 250° F. to about 350° F. and particularly 285° F., for a time period of from about 10 seconds to about 2 minutes and particularly 1 minute; followed by subjecting the heated vinyl layer to a second temperature, greater than the first temperature, of from about 350° F. to about 450° F. for a time period of from about 15 seconds to about 3 minutes; has been found to produce a vinyl film with excellent heat stability and printability characteristics. These aspects are described herein in the Examples section.

In certain versions the following heating schedules can be used: (i) heating at 285° F. for 1 minute followed by heating at 365° F. for 2 minutes; (ii) heating at 285° F. for 1 minute followed by heating at 395° F. for 30 seconds; or (iii) heating at 285° F. for 1 minute followed by heating at 410° F. for 30 seconds.

All references to heating of a vinyl layer noted herein are with regard to a layer of vinyl composition having a thickness of 1.50 mils.

As previously noted, in certain embodiments, the vinyl composition can be formed into a layer or film by applying the composition onto a substrate such as a polymeric film. In these applications, it has been found that the cast vinyl layer can retain solvent(s) that may impact UV stability and printing.

Although the vinyl films and laminates using such described herein are primarily directed for use applied to vehicles and signage, it will be understood that the present subject matter is not limited to such applications. Instead, the present subject matter may find wide application in a variety of other industries and uses. That is, the present subject matter also provides articles such as for example, signs, graphics, wall coverings, pressure sensitive products, banners, fleet marketing graphics, architectural coverings, consumer product labeling, and the like.

EXAMPLES

In order to further evaluate the vinyl compositions, their components, vinyl films and/or laminates of the present subject matter, several techniques were developed. Application of these techniques to the present subject matter is as follows.

Hansen Solubility Parameters

Hansen Solubility Parameters (HSP) were developed as a way of predicting if one material will dissolve in another and form a homogeneous solution. These parameters are based on the concept that "like dissolves like" where one molecule is defined as being like another if it bonds to itself in a similar way. Hansen Solubility Parameters are described in greater detail in Hansen, Charles, "Hansen Solubility Parameters, A User's Handbook," Second Edition, (1967), CRC PRESS, ISBN 978-0-8493-7248-3.

Specifically, each molecule is given three Hansen parameters, each generally measured in $MPa^{0.5}$:

δD: The energy from dispersion forces between molecules;

δP: The energy from dipolar intermolecular force between molecules; and

δH: The energy from hydrogen bonds between molecules.

A working theory for the present evaluation is that the "closer" the distance between two materials, the more compatible they are and less likely to separate. The distance is calculated using formula (I):

$$\text{Distance} = \sqrt{4(\delta D_1 - \delta D_2)^2 + (\delta H_1 - \delta H_2)^2 + (\delta P_1 - \delta P_2)^2} \quad (I)$$

The solubility of a component or material is only an indicator of miscibility. There may be a material that is less compatible than another, but the functional chemical attributes may be superior.

Comparing the empirical data to HSP relationships indicates preferred performance trends. This analysis has demonstrated that vinyl films for these applications have better performance when the plasticizer is more compatible with the solute.

Hansen Solubility Parameters were utilized to assess and ultimately determine particular plasticizers, UV stabilizers, heat stabilizers, epoxides, print additives, and PVC resins for use in the vinyl compositions.

Figure 13:
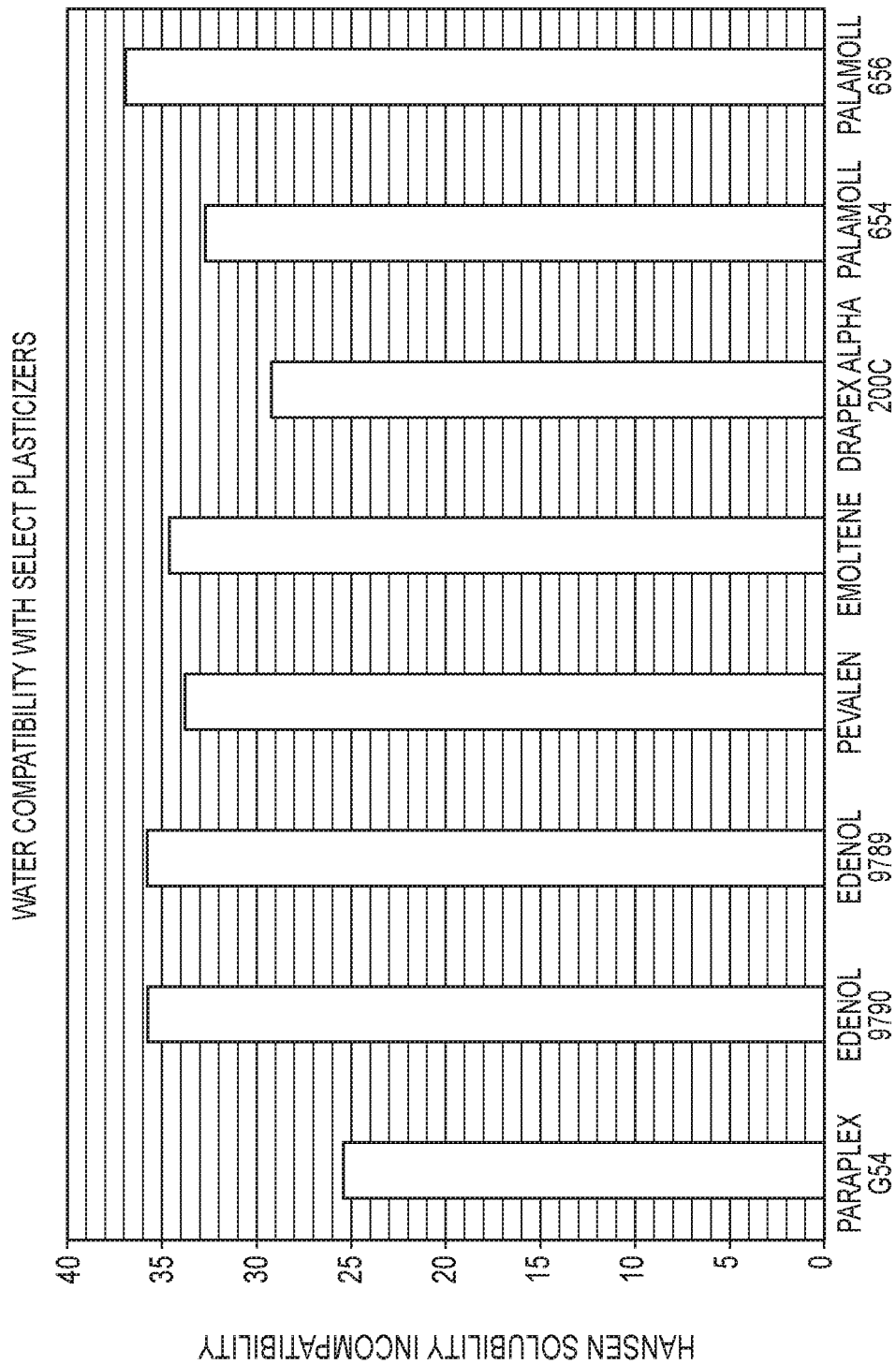
FIG. 13 is a graph comparing compatibility of various plasticizers with water using HSP.

Water compatibility might indicate if a plasticizer is susceptible to wash out with rainfall over time. Among the materials tested, the Palamoll® 656 plasticizer was the least compatible with water, while the Paraplex G54 plasticizer was the most compatible. This is evident by the results shown in FIG. 13. Thus in evaluating plasticizers using HSP with regard to water, there is a preference for materials similar to Palamoll® 656, as these would exhibit the desired HSP incompatibility.

Hansen Solubility Parameters were also used to assess and ultimately determine particular UV stabilizers as follows.

Hansen Solubility Parameters were also used to evaluate print additives.

Figure 14:
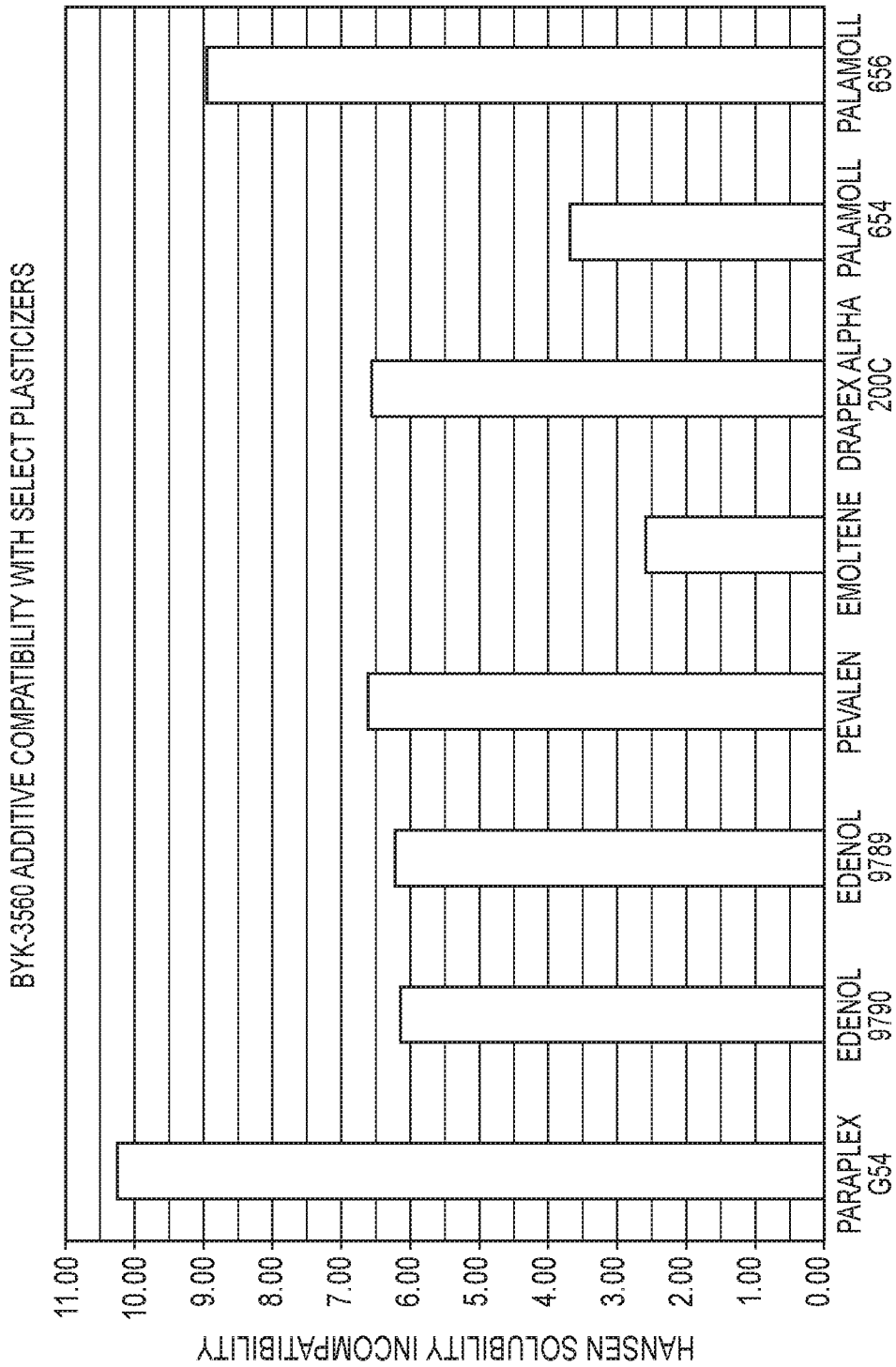
FIG. 14 is a graph comparing compatibility of a print enhancing additive with various plasticizers using HSP.
Figure 15:
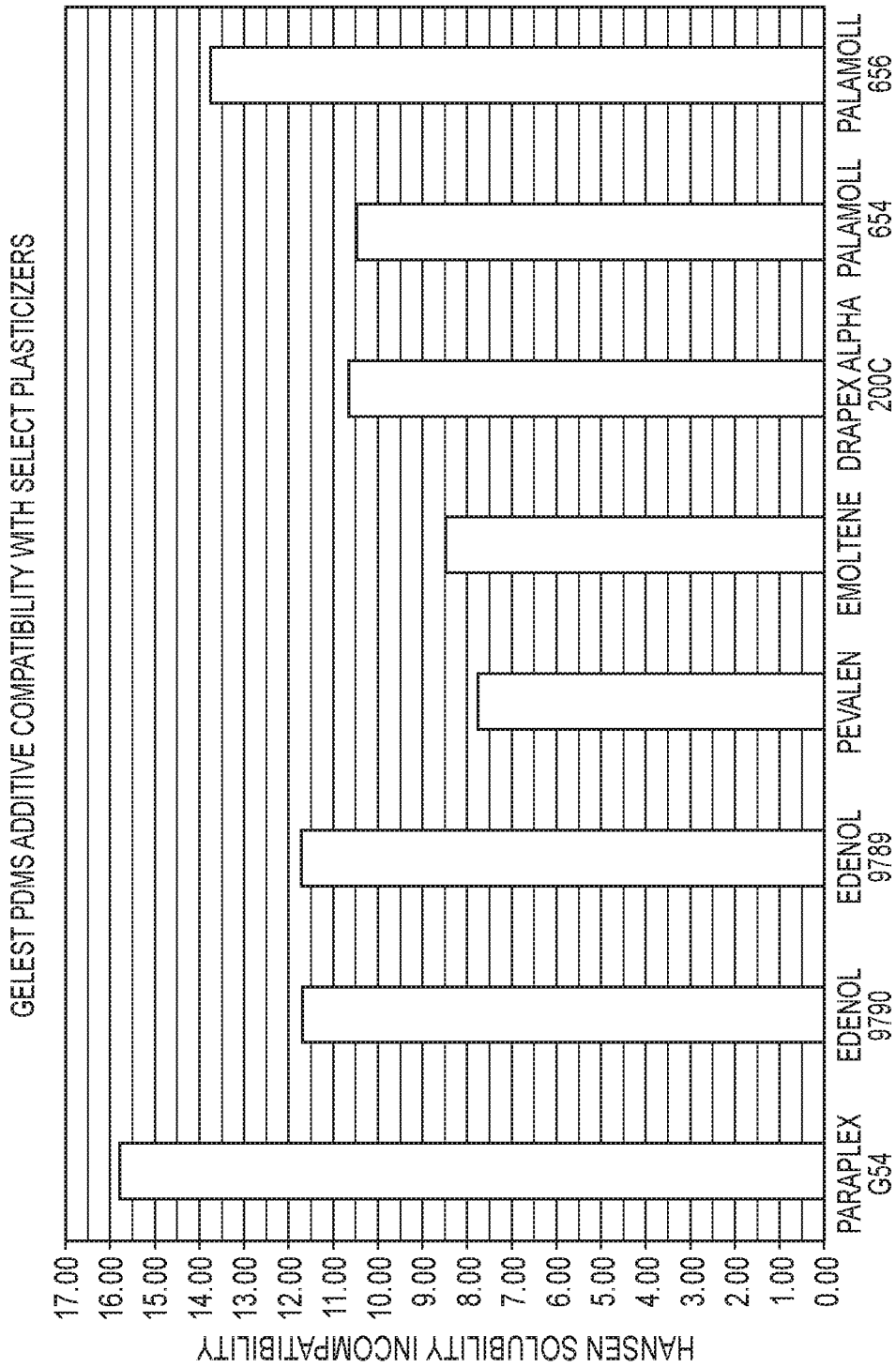
FIG. 15 is a graph comparing compatibility of a print enhancing additive with various plasticizers using HSP.

The print additives are expected to bloom to the surface of the vinyl film. This suggests that a certain amount of immiscibility with other components is required. Polyether acrylate is a leveling agent that acts as a surfactant. Silanol-terminated PDMS can help control dot spread and eliminates a "coffee-ring effect" in digital solvent inks. The compatibility of both additives is similar among the selected plasticizers, as shown in FIGS. 14 and 15.

Print Evaluation and Ink Dot Diameters

It is difficult to quantify printing because there are multiple aspects to consider. Aside from gloss, it was decided to combine multiple measurements to create a comparative factor. In many applications, printing dot size (diameter) is a very important measurement—too large or too small can create a poor image. Based upon previous evaluations, 55 microns is used as a preferred target print dot diameter.

In an evaluation of the effect on heating of a vinyl layer that subsequently receives print, it was found that using a relatively high heating temperature in forming the vinyl layer, leads to greater consistency in print dot size. Table 4 summarizes these results.

TABLE 4

Summary of Effect on Heating on Printing Quality

| Heating Schedule | | Printing Dot Diameter | Standard Deviation of Printing Dot |
|---|---|---|---|
| First Phase | Second Phase | (microns) | Diameter (microns) |
| 350° F., 120 sec | — | 52.4 | 12.6 |
| 356° F., 120 sec | — | 52.1 | 9.3 |
| 220° F., 30 sec | 385° F., 60 sec | 55.1 | 5.2 |
| 285° F., 30 sec | 365° F., 60 sec | 121 | 32.5 |
| 285° F., 30 sec | 395° F., 60 sec | 49.9 | 5.8 |
| 285° F., 30 sec | 410° F., 60 sec | 45.4 | 2.6 |

Figure 16:
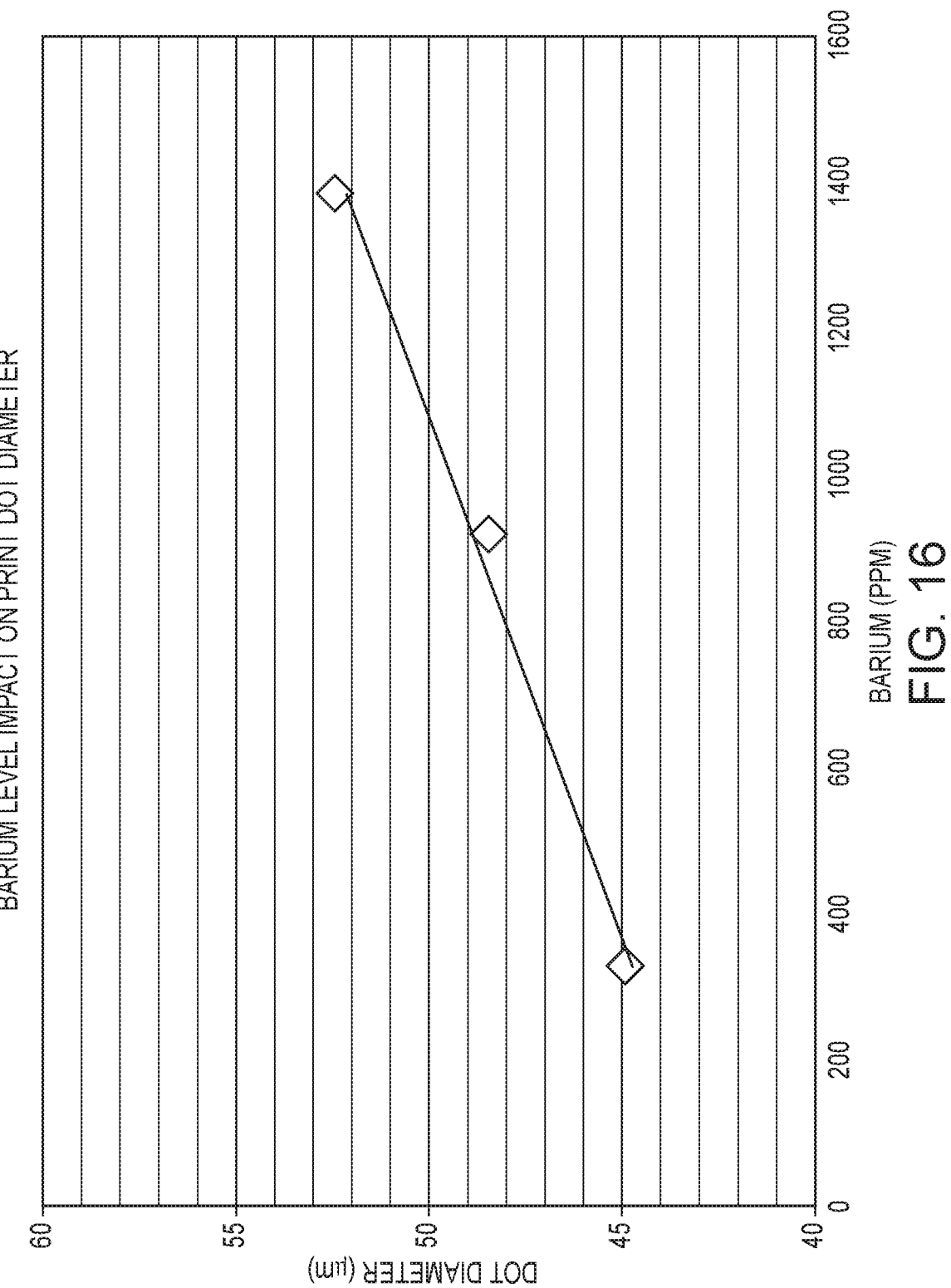
FIG. 16 illustrates effect of barium concentration in a heat stabilizer of a vinyl film of the present subject matter.
Figure 17:
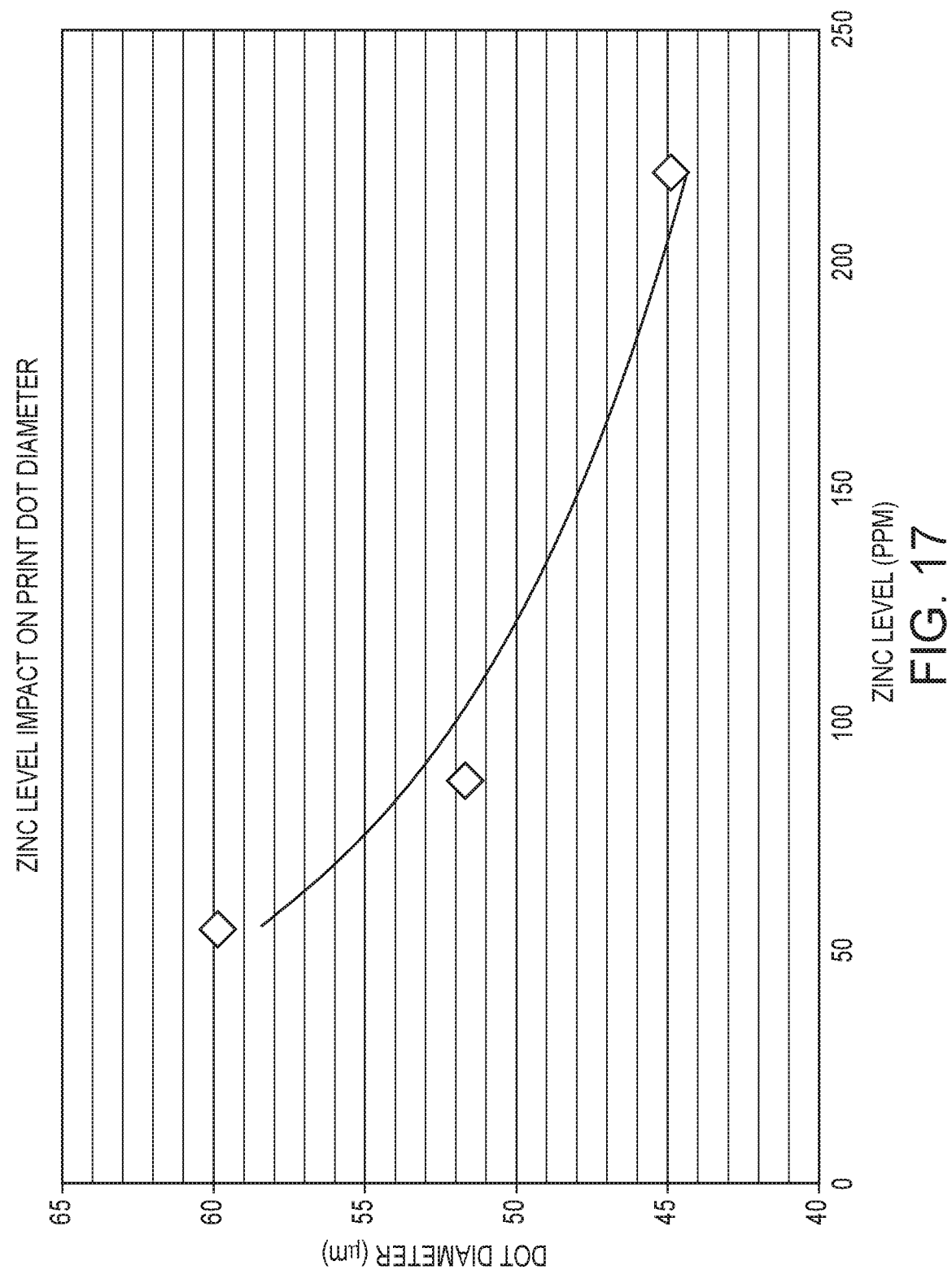
FIG. 17 illustrates effect of zinc concentration in a heat stabilizer of a vinyl film of the present subject matter.
Figure 18:
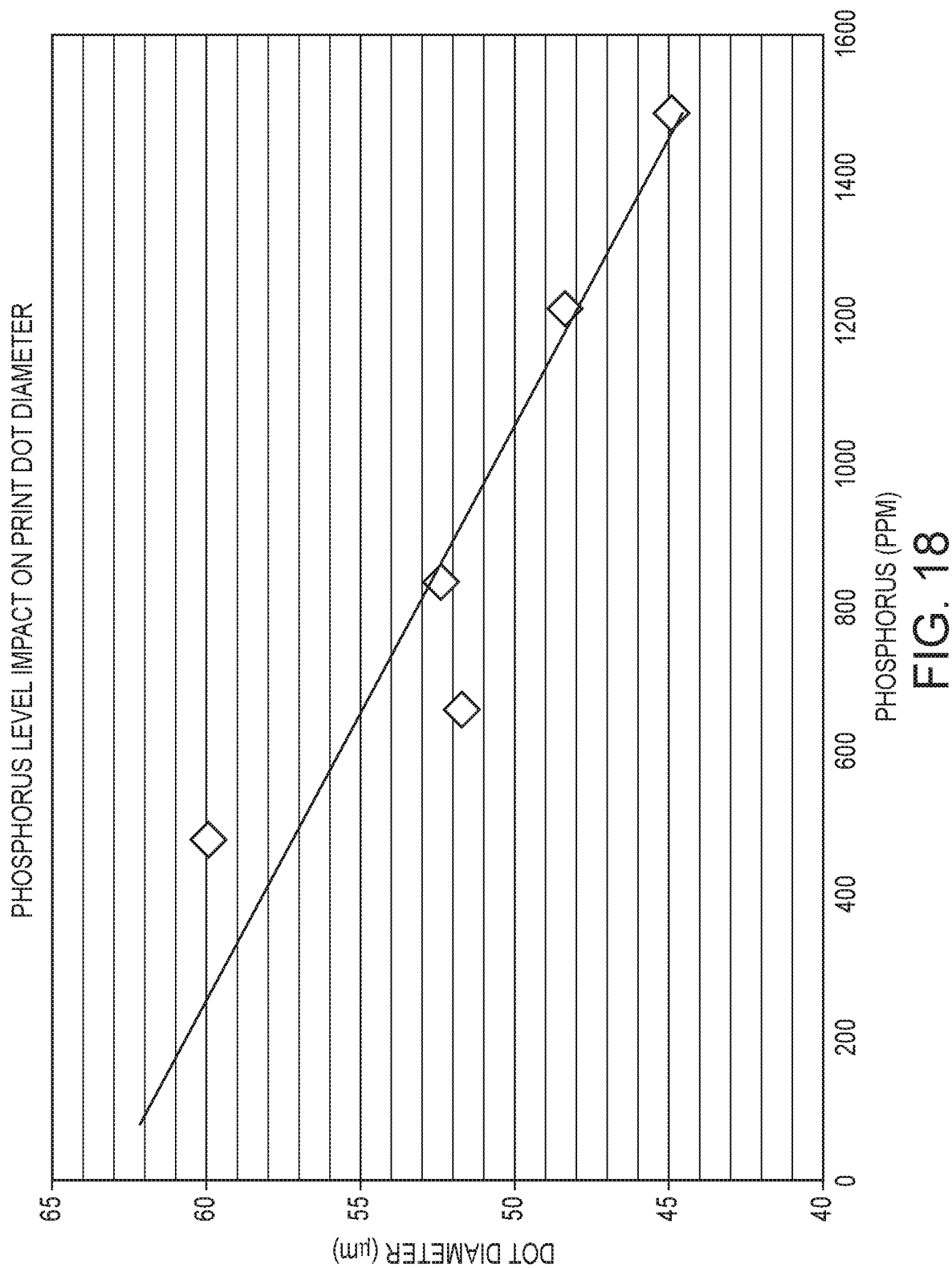
FIG. 18 illustrates effect of phosphorus concentration in a heat stabilizer of a vinyl film of the present subject matter.

In another evaluation, the effect of barium content, zinc content, and phosphorus content of heat stabilizers used in the vinyl films and laminates was investigated. FIG. 16 illustrates increasing barium content of a heat stabilizer increases solvent ink dot diameter. FIG. 17 illustrates increasing zinc content of a heat stabilizer reduces solvent ink dot diameter. FIG. 18 illustrates increasing phosphorus content of a heat stabilizer reduces solvent ink dot diameter.

Elongation and Young's Modulus

In another series of evaluations, various UV stabilizer(s) were studied using measurements and comparisons between vinyl films using the UV stabilizers. The measurements included tensile elongation at break of the vinyl films, as defined in ASTM D882 or ISO 527-3. Additional measurements were made of Young's Modulus of the vinyl films. Measurement of Young's Modulus was performed in accordance with ASTM D882 or ISO 527-3.

Super UV Evaluation

In another series of evaluations, UV protection provided by the vinyl films was reviewed. Specifically, selection of the UV stabilizer(s) was evaluated by results of a "Super UV" evaluation. A Super UV evaluation or test can provide an indication of the extent of UV protection provided by a vinyl film. The Super UV test is conducted conditions of 70° C. and 50% RH; the samples are exposure to UV light in a range of 300-400 nm @ 5.4 mJ/hr and 295-385 nm @ 4.824 mJ/hr. In an additional investigation, weatherability of a known commercial vinyl film and designated for this particular investigation as Sample A, was compared to a vinyl film of the present subject matter designated as Sample B. In this evaluation, weatherability was assessed by measuring Delta E (ΔE) of the noted samples and noting the onset of any brown spot formations. Delta E is defined by the International Commission on Illumination (CIE) using method CIE76; it is the measurable difference in color of a sample.

Figure 19:
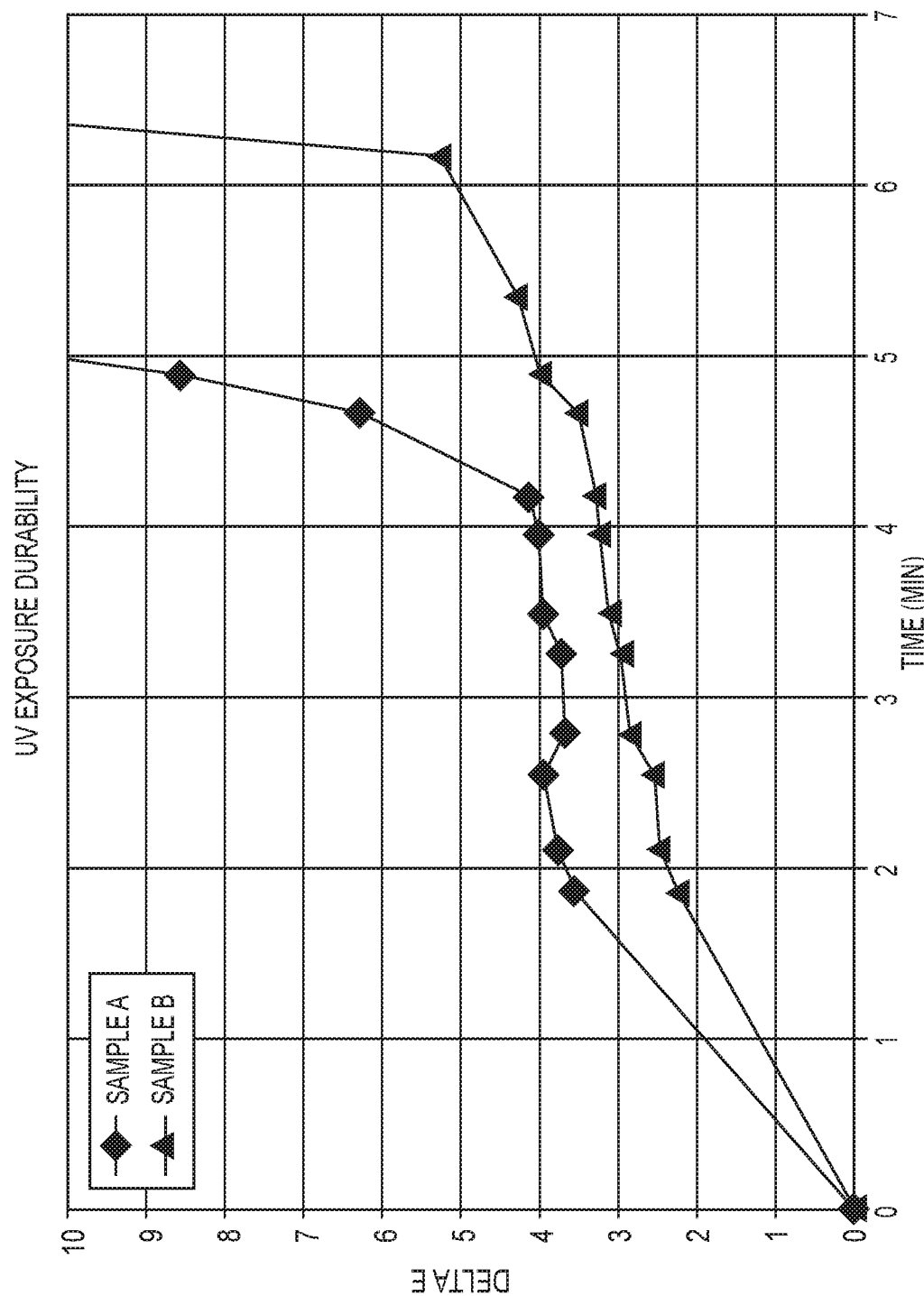
FIG. 19 is a graph comparing delta E measurements of vinyl films.

FIG. 19 illustrates the significantly reduced delta E of the Sample B film as compared to that of the known film Sample A.

Print Evaluation and Droplet/Dot Contact Angles

In another series of evaluations, the effect of selection and use of various print additives upon printing quality of films and/or laminates was investigated. Vinyl films were prepared as described below and ink dots were printed on the film sample. Contact angles for water and tricresyl phosphate (TCP) are noted for each sample along with surface energy polar and dispersive components in Table 5.

TABLE 5

Effect of Various Print Additives in Vinyl Films

| | Contact Angle | | Surface Energy Polar and Dispersive Components | | |
|---|---|---|---|---|---|
| Sample | Water | TCP | σT | σP | σD |
| A | 64.2 ± 2.2 (4, 1.4)** | 25.1 ± 1.4 (4, 0.9) | 43.7 ± 1.3 (4, 0.8) | 14.11 | 29.62 |
| B | 88.8 ± 0.3 (4, 0.2) | 40.0 ± 2.4 (4, 1.5) | 32.2 ± 0.9 (4, 0.6) | 2.75 | 29.43 |
| C | 89.8 ± 2.2 (4, 1.4) | 53.7 ± 2.3 (4, 1.5) | 26.9 ± 1.3 (4, 0.8) | 3.94 | 22.92 |
| D | 90.4 ± 2.0 (4, 1.2) | 59.2 ± 3.8 (4, 2.4) | 24.7 ± 1.8 (4, 1.2) | 4.49 | 20.21 |
| E | 77.4 ± 2.8 (4, 1.7) | 42.0 ± 1.8 (4, 1.2) | 34.2 ± 1.5 (4, 1.0) | 8.27 | 25.97 |

In the results summarized in Table 5, Sample A was a commercial vinyl film known in the industry. Sample B is a vinyl film as described herein using a monomeric epoxidized soybean oil based plasticizer, but free of print additives. Sample C is a vinyl film of Sample B also including additive polyether acrylate. Sample D is a vinyl film of Sample B also including a PDMS agent. And Sample E is a vinyl film of Sample B also including both the polyether acrylate and the PDMS agent. These results demonstrate that each additive increases contact angle; although each additive increases polar function, they also reduce dispersive function resulting in a loss of total surface energy. The unique finding is that the combination of the two additives greatly increases polar function with less loss of dispersive function; this results in an increase of total surface energy.

Metal Degradation

For certain applications such as those involving application of the vinyl films and/or laminates utilizing such vinyl films to metal substrates, it may be desirable to limit or reduce the potential for transmission of water and/or other species through the vinyl film and/or laminate to the underlying metal substrate. In such applications, degradation of a metal substrate is believed to result from one or more of the following mechanisms. As previously noted, as vinyl in the vinyl film deteriorates, formation of hydrochloric acid (HCl) occurs. Chloride ions can migrate through the film/laminate and react with oxygen, water, and/or metal along the substrate surface. For example, for an aluminum substrate, the resulting galvanic reactions can lead to formation of aluminum oxide and/or aluminum chloride corrosion product(s). The occurrence of such can then lead to loss of adhesion between the film/laminate and the metal substrate and/or delamination or other undesirable effects. Another mechanism occurring in such applications involves reactions between the metal substrate and external cleaning agents that may be applied to the film/laminate. Such cleaning agents typically contain caustic components or oxidizing agents and can lead to loss of adhesion, delamination, and/or other undesirable effects.

Another series of evaluations were performed to assess strategies for reducing species permeability through the films/laminates. Transmission rates of water (WVTR) and oxygen (OTR) were measured of various laminates including vinyl films. It was concluded that OTR was a better predictor than WVTR in assessing metal degradation in the noted application. And so using OTR measurements of various laminates, selection of characteristics of a vinyl film used in the laminates can be improved.

In addition, it was found that another potential cause of metal degradation relates to attack from chemical species along peripheral or edge regions of a vinyl film or laminate using such. That is, chemical species may enter or migrate through peripheral edges of a laminate to the underlying metal substrate and lead to undesirable loss of adhesion, delamination, and the like.

To counter this, it was found that improving the surface tension of the adhesive(s) used in the laminate can significantly reduce metal degradation. The higher surface tension adhesives typically result in reduced laminate edge attack from chemical species. Many of the adhesives described herein and particularly the noted urethane adhesives used in the first adhesive layer exhibit these desirable characteristics.

Thus, by improving barrier resistance, i.e., reducing OTR characteristics, and increasing edge resistance by using higher surface tension adhesives in the laminates, degradation of an underlying metal substrate can be significantly reduced in accordance with the present subject matter.

Combination of PVC Resins

Another series of evaluations were undertaken to assess the resulting properties of a blend of PVC resins as compared to each of the individual resins utilized in the blend.

In many embodiments, a coefficient of retroreflectivity should be greater than 70 cd/lx/sqrm in order for the resulting film to be considered a viable product. The coefficient of retroreflectivity is measured according to ASTM E810@-4° EA/0.2° OA in which EA is the entry angle and OA is the observation angle.

Figure 20:
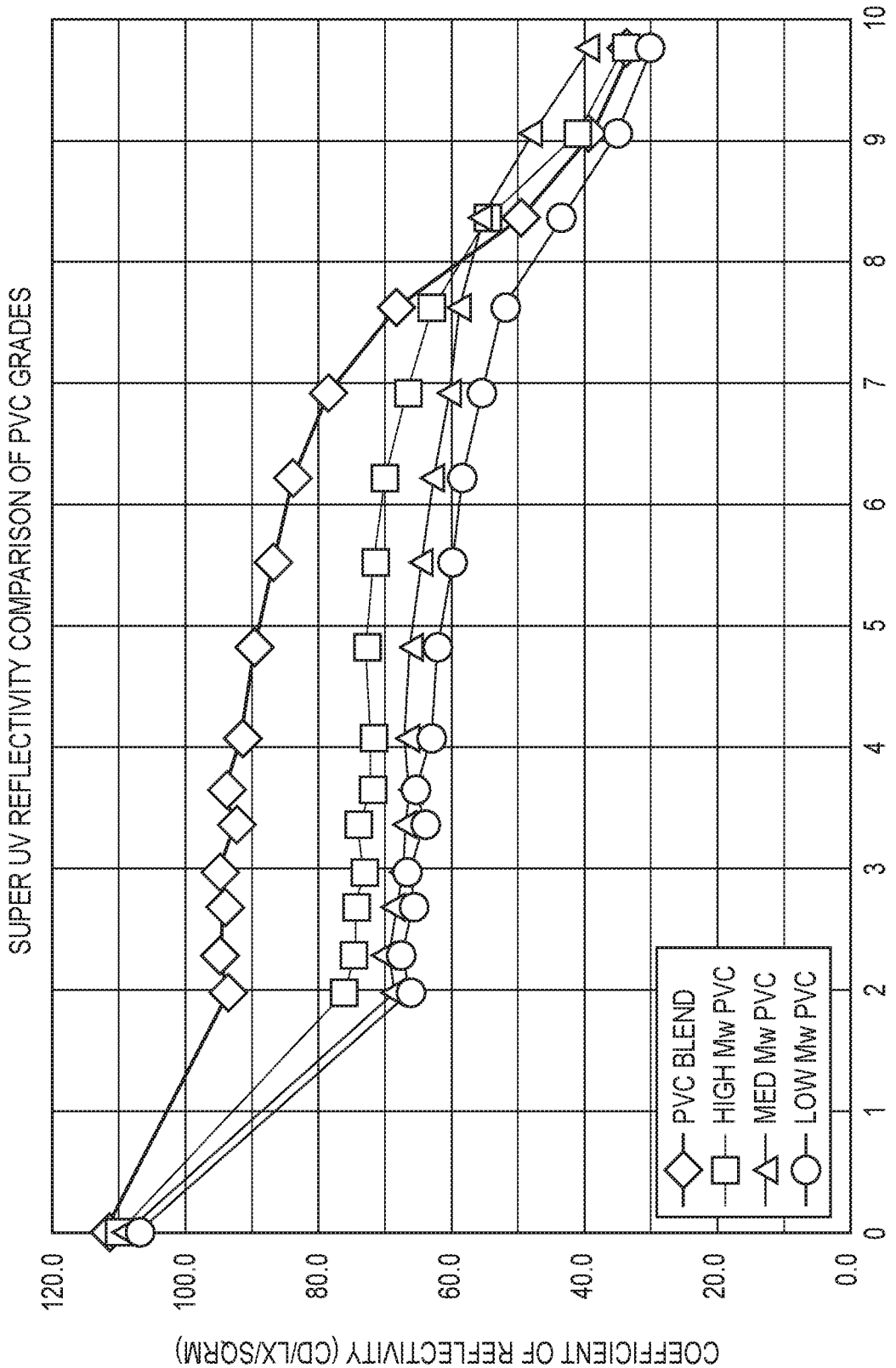
FIG. 20 is a graph comparing coefficient of retroreflectivity for a PVC blend, a high molecular weight PVC resin, an intermediate or medium molecular weight resin, and a low molecular weight PVC resin.

A combination of a high molecular weight PVC resin, an intermediate molecular weight (or medium weight) PVC resin, and a low molecular weight PVC resin (these terms as described herein) provides the highest viable retroreflectivity over a typical product life span of about 5 to about 7 years. This is illustrated in FIG. 20.

Figure 21:
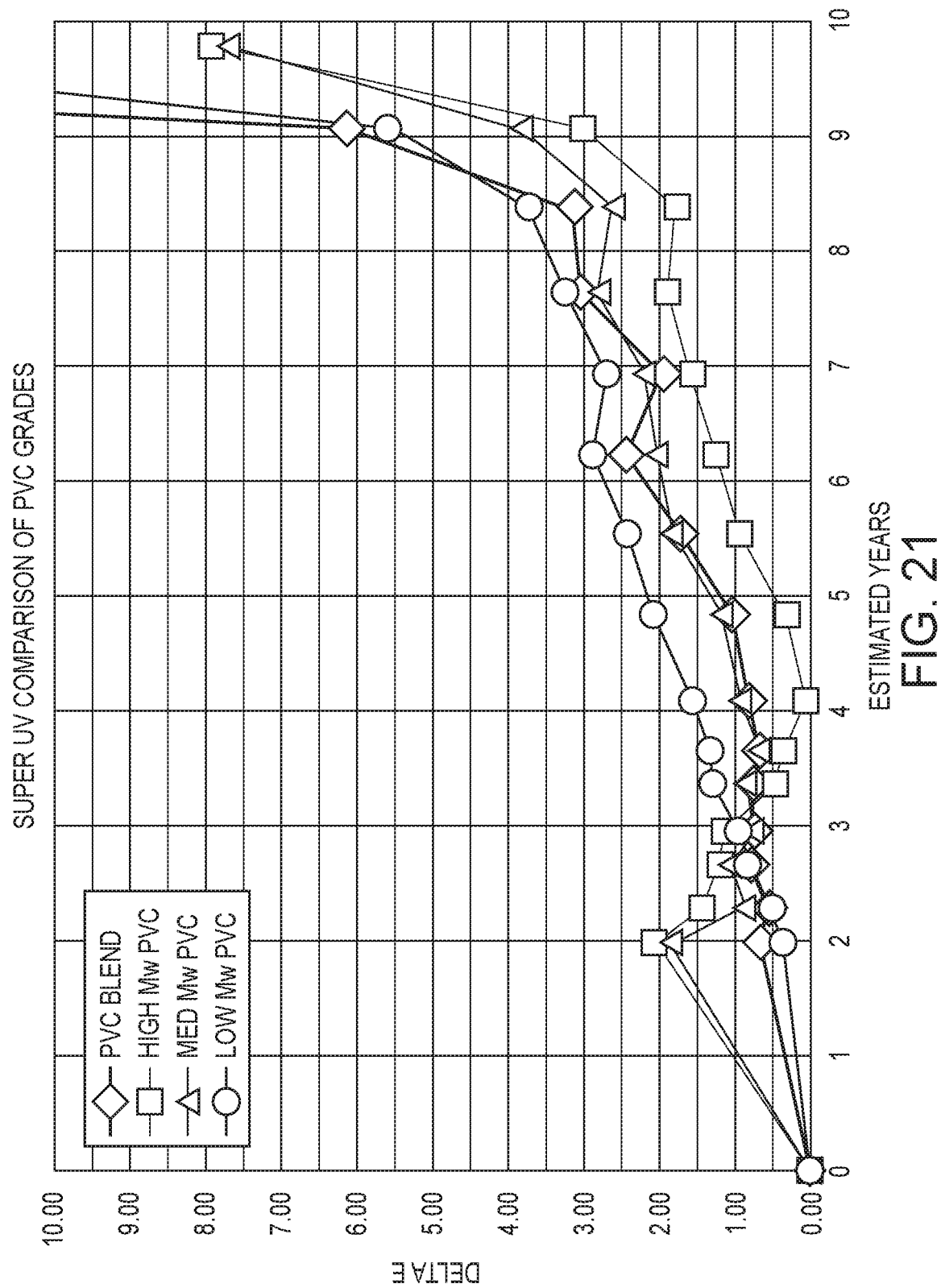
FIG. 21 is a graph comparing Delta E values for a PVC blend, a high molecular weight PVC resin, an intermediate or medium molecular weight resin, and a low molecular weight PVC resin.

Typically, the high molecular weight PVC resin provides the best UV stability, but presents difficulty in bonding to a urethane adhesive. And so, the use of a combination of the noted PVC resins provides a balance between adhesion and UV performance. UV performance of the PVC resins and their resulting combination is shown in FIG. 21.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

What is claimed is:

1. A vinyl film comprising:
   polyvinyl chloride (PVC);
   at least one plasticizer;
   at least one UV stabilizer;
   at least one heat stabilizer; and
   at least one print additive;
     wherein the PVC includes:
     from 15 to 60 parts per hundred of a low molecular weight PVC resin;
     from 15 to 60 parts per hundred of an intermediate molecular weight PVC resin; and
     from 40 to 90 parts per hundred of a high molecular weight PVC resin; and
       wherein the film has a thickness within a range of from 1.20 mils (30.5 microns) to 2.00 mils (50.8 microns).

2. The vinyl film of claim 1 wherein the at least one plasticizer includes a bio-based plasticizer.

3. The vinyl film of claim 1 wherein the at least one UV stabilizer is selected from the group consisting of (i) oxanilide or oxanilide-based compounds, (ii) hindered amine light stabilizers (HALS), and (iii) combinations thereof.

4. The vinyl film of claim 1 wherein the at least one heat stabilizer is a barium-zinc heat stabilizer that includes both barium and zinc.

5. The vinyl film of claim 4 wherein the barium-zinc heat stabilizer includes both barium and zinc at a molar ratio greater than 3.85:1.

6. The vinyl film of claim 5 wherein the ratio is greater than 4:1.

7. The vinyl film of claim 1 wherein the print additive includes at least one agent selected from the group consisting of surfactants, polydimethyl siloxanes, and combinations thereof.

8. The vinyl film of claim 7 wherein the print additive includes surfactants and polydimethyl siloxanes in a weight ratio of 4.8:1.

9. The vinyl film of claim 7 wherein the print additive includes surfactants and polydimethyl siloxanes in an amount less than 1.60% by weight.

10. The vinyl film of claim 1 wherein the at least one PVC resin is present in an amount of from 30% to 85% by weight.

11. The vinyl film of claim 1 wherein the at least one plasticizer is present in an amount of from 15% to 50% by weight.

12. The vinyl film of claim 1 wherein the at least one PVC resin is present in an amount of from 30% to 85% by weight, and the at least one plasticizer is present in an amount of from 15% to 50% by weight.

13. The vinyl film of claim 1 further comprising at least one epoxide.

14. A laminate comprising:
    a vinyl film;
    a first adhesive layer;
    optical components;
    a spacing layer;
    a metal layer; and
    a second adhesive layer;
      wherein the vinyl film includes polyvinyl chloride (PVC), at least one plasticizer, at least one UV stabilizer, at least one heat stabilizer, and at least one print additive;
      wherein the PVC includes:
      from 15 to 60 parts per hundred of a low molecular weight PVC resin;
      from 15 to 60 parts per hundred of an intermediate molecular weight PVC resin;
      from 40 to 90 parts per hundred of a high molecular weight PVC resin; and
        wherein the film has a thickness within a range of from 1.20 mils (30.5 microns) to 2.00 mils (50.8 microns).

15. The laminate of claim 14 wherein at least a portion of the spacing layer is disposed between the optical components and the metal layer.

16. The laminate of claim 14 wherein the first adhesive layer is disposed between the vinyl film and at least one of (i) the optical components and (ii) the spacing layer.

17. The laminate of claim 14 wherein the metal layer is disposed between the spacing layer and the second adhesive layer.

18. The laminate of claim 14 wherein the vinyl film is disposed immediately adjacent to the first adhesive layer.

19. The laminate of claim 14 wherein the optical components are disposed between the first adhesive layer and the metal layer.

20. The laminate of claim 14 wherein the at least one plasticizer includes a bio-based plasticizer.

21. The laminate of claim 14 wherein the at least one UV stabilizer is selected from the group consisting of (i) oxanilide or oxanilide-based compounds, (ii) hindered amine light stabilizers (HALS), and (iii) combinations thereof.

22. The laminate of claim 14 wherein the at least one heat stabilizer is a barium-zinc heat stabilizer that includes both barium and zinc.

23. The laminate of claim 22 wherein the barium-zinc heat stabilizer includes both barium and zinc at a molar ratio greater than 3.85:1.

24. The laminate of claim 23 wherein the ratio is greater than 4:1.

25. The laminate of claim 14 wherein the print additive includes at least one agent selected from the group consisting of surfactants, polydimethyl siloxanes, and combinations thereof.

26. The laminate of claim 25 wherein the print additive includes surfactants and polydimethyl siloxanes in a weight ratio of 4.8:1.

27. The laminate of claim 25 wherein the print additive includes surfactants and polydimethyl siloxanes in an amount less than 1.60% by weight.

28. The laminate of claim 14 wherein the at least one PVC resin is present in an amount of from 30% to 85% by weight.

29. The laminate of claim 14 wherein the at least one plasticizer is present in an amount of from 15% to 50% by weight.

30. The laminate of claim 14 wherein the at least one PVC resin is present in an amount of from 30% to 85% by weight, and the at least one plasticizer is present in an amount of from 15% to 50% by weight.

31. The laminate of claim 14 wherein the first adhesive layer includes a urethane adhesive.

32. The laminate of claim 14 wherein the spacing layer includes a component selected from the group consisting of acrylics, polyvinyl butyrals, aliphatic urethanes, polyesters, copolymers of ethylene and an acrylic acid or methacrylic acid, vinyls, fluoropolymers, polyethylenes, cellulose acetate butyrate, polycarbonates, polyacrylates, and combinations thereof.

33. The laminate of claim 32 wherein the spacing layer includes polyvinyl butyral.

34. The laminate of claim 14 wherein the optical components are in a particulate form and are at least partially disposed in the spacing layer.

35. The laminate of claim 34 wherein the optical components include glass microspheres.

36. The laminate of claim 14 wherein the metal of the metal layer is silver or aluminum.

37. The laminate of claim 14 wherein the second adhesive layer includes a pressure sensitive adhesive.

38. The laminate of claim 14 wherein the vinyl film defines an outer face, the laminate further comprising at least one region of print on the outer face of the vinyl film.

39. The laminate of claim 14 further comprising:
a release liner disposed on the second adhesive layer.

40. The laminate of claim 14 wherein the film further includes at least one epoxide.

* * * * *